United States Patent
Garrett et al.

(10) Patent No.: US 6,832,929 B2
(45) Date of Patent: Dec. 21, 2004

(54) ROBUST SERIAL ADVANCED TECHNOLOGY ATTACHMENT (SATA) PCB CONNECTOR

(75) Inventors: William W. Garrett, Rancho Santa Margarita, CA (US); Marc B. Goldstone, Irvine, CA (US); Dalwinder Singh, Irvine, CA (US); Colin W. Morgan, Mission Viejo, CA (US); Mark A. Baskovich, Orange, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/295,665

(22) Filed: Nov. 15, 2002

(65) Prior Publication Data

US 2004/0097123 A1 May 20, 2004

(51) Int. Cl.[7] .............................................. H01R 13/64
(52) U.S. Cl. ....................................... 439/378; 439/680
(58) Field of Search ................................ 439/378, 680, 439/379–381, 374, 297

(56) References Cited

U.S. PATENT DOCUMENTS

| | | | |
|---|---|---|---|
| 5,199,884 A | 4/1993 | Kaufman et al. | 439/74 |
| 5,356,300 A | * 10/1994 | Costello et al. | 439/101 |
| 5,466,171 A | 11/1995 | Bixler et al. | 439/378 |
| 5,885,088 A | * 3/1999 | Brennan et al. | 439/680 |
| 6,053,761 A | 4/2000 | Baron et al. | 439/378 |
| 6,234,817 B1 | 5/2001 | Hwang | 439/247 |
| 6,331,122 B1 | 12/2001 | Wu | 439/567 |
| 6,402,552 B1 | 6/2002 | Wagner | 439/606 |
| 6,447,340 B1 | 9/2002 | Wu | 439/660 |
| 2002/0055292 A1 | 5/2002 | Maiers et al. | 439/378 |
| 2002/0151226 A1 | * 10/2002 | Boe | 439/686 |
| 2003/0045175 A1 | * 3/2003 | Lynch et al. | 439/680 |
| 2003/0119366 A1 | * 6/2003 | Wu | 439/636 |

OTHER PUBLICATIONS

Serial ATA: High Speed Serialized AT Attachment; Aug. 29, 2002 (rev 1.0); pp. 38–67.

* cited by examiner

Primary Examiner—Michael C. Zarroli
(74) Attorney, Agent, or Firm—Milad G. Shara, Esq.; Blakely, Sokoloff, Taylor & Zafman

(57) ABSTRACT

A printed circuit board (PCB) connector configured in accordance with a Serial Advanced Technology Attachment (SATA) standard. The PCB connector is for connection to a PCB. The PCB connector includes a first blade connector for supporting a first electrical contact arrangement in accordance with a SATA standard, a housing for supporting the first blade connector and the first electrical contact arrangement, and a pair of laterally-opposed guide arm receiving cavities being integrally formed with the housing. The housing defines a cable connector receiving area around the first blade connector for receipt of a cable connector. Further, the guide arm receiving cavities are disposed outside of the cable connector receiving area and are adapted for the receipt of guide arms from a mating cable connector.

23 Claims, 19 Drawing Sheets

ROBUST SERIAL ADVANCED TECHNOLOGY ATTACHMENT (SATA) PCB CONNECTOR

BACKGROUND OF THE INVENTION

1. Field of the Invention

The present invention relates to connectors. More particularly, the present invention relates to a robust printed circuit board (PCB) connector configured in accordance with a Serial Advanced Technology Attachment (SATA) standard.

2. Description of the Prior Art and Related Information

Today, computers are routinely used both at work and in the home. Computers advantageously enable file sharing, the creation of electronic documents, the use of application specific software, and electronic commerce through the Internet and other computer networks. Typically, each computer has a storage peripheral. For example, the most common type of storage peripheral is a rotating media storage device (RMSD), such as a disk drive (e.g. a hard disk drive). However, other types of storage peripherals such as solid-state disk drive emulators utilizing flash memory are becoming increasingly common.

Disk drives are typically connected to a host computer through a host interface connector for the transfer of commands, status and data. The host computer accesses the disk drive and reads data from the disk drive and/or saves data to the disk drive. The disk drive is typically connected to the host computer via a cable and a cable connector that connects to a PCB connector of the disk drive. For compatibility, the connectors and interface protocol are standardized. Accordingly, the cable, cable connector, and PCB connector must comply with the same interface standard. There are several disk drive interface standards, e.g., Advanced Technology Attachment (ATA) and Small Computer System Interface (SCSI) that have become common in the last decade.

However, disk drives are now being designed to comply with a newer standard, generally referred to as the Serial Advanced Technology Attachment (SATA) standard, which is the standard presently favored for newer computers. The SATA standard is being promulgated by the Serial ATA Working Group and is specifically referred to as the Serial ATA: High Speed Serialized AT Attachment specification or Serial ATA standard 1.0. The SATA specification defines various general standards for SATA compliant cable connectors, SATA compliant cables, and SATA compliant PCB connectors that mount to a printed circuit board (PCB).

The SATA PCB connector defined in the SATA specification basically specifies an insulated housing, a first blade connector for supporting an electrical contact arrangement configured for data signals, a second blade connector for supporting an electrical contact arrangement configured for power signals, and two board locks fixed to the housing for attaching the PCB connector to a PCB. Further, the SATA PCB connector defined in the SATA specification sets forth that the housing includes a pair of opposed guide slots in each one of two opposite side walls of the housing that define a cable connector receiving area. The pair of opposed guide slots aid in guiding cable and back-plane connectors to mate with a blade connector.

Unfortunately, the blade connectors specified by the SATA standard are prone to mechanical failure when utilizing presently manufactured SATA compliant cable connectors and PCB connectors. Oftentimes, the blade connector of a SATA PCB connector breaks when a SATA cable connector is mated to it. This is because mating SATA cable connectors are not suitably constrained by the housing of the SATA PCB connector. Furthermore, the respective electrical contact arrangements for power and data signals, as specified by the SATA standard, may not adequately ensure that electrostatic discharge (ESD) will be consistently discharged with the first mate ground contact.

SUMMARY OF THE INVENTION

The present invention relates to a robust PCB connector configured in accordance with a Serial Advanced Technology Attachment (SATA) standard.

In one aspect, the invention may be regarded as a PCB connector for connection to a printed circuit board (PCB). The PCB connector includes a first blade connector for supporting a first electrical contact arrangement in accordance with a SATA standard, a housing for supporting the first blade connector and the first electrical contact arrangement, and at least one guide arm receiving cavity being integrally formed with the housing. The housing defines a cable connector receiving area around the first blade connector for receipt of a cable connector. Further, the guide arm receiving cavity is disposed outside of the cable connector receiving area and is adapted for the receipt of a guide arm from a mating cable connector In one embodiment, the first electrical contact arrangement may be configured for data signals in accordance with the SATA standard. Alternatively, in another embodiment, the first electrical contact arrangement may be configured for power signals in accordance with the SATA standard.

In a more detailed embodiment, the PCB connector may include a second blade connector having a second electrical contact arrangement in accordance with the SATA standard. The second blade connector is also located inside of the cable connector receiving area of the housing. For example, in one embodiment, the first electrical contact arrangement may be configured for data signals in accordance with the SATA standard and the second electrical contact arrangement may be configured for power signals in accordance with the SATA standard.

In an even more detailed embodiment, the PCB connector may include a substantially thickened strengthening wall disposed between the cable connector receiving area and the guide arm receiving cavity. The guide arm receiving cavity may include a conductive surface. For example, the conductive surface may include a grounding tab. In another embodiment, the housing and the guide arm receiving cavity may be made from a conductive plastic material. Further, the guide arm receiving cavity may be approximately rectangularly shaped. Additionally, the SATA standard may be a Serial Attached Small Computer System Interface (SAS) standard. Moreover, in further embodiments, the housing may optionally include a legacy Integrated Drive Electronics (IDE) power receptacle and/or a user section receptacle.

In another aspect, the invention may be regarded as a PCB connector for connection to a printed circuit board (PCB). The PCB connector includes a first blade connector for supporting a first electrical contact arrangement in accordance with a SATA standard, a housing for supporting the first blade connector and the first electrical contact arrangement, and a pair of laterally-opposed guide arm receiving cavities being integrally formed with the housing. The housing defines a cable connector receiving area around the first blade connector for receipt of a cable connector.

Further, the guide arm receiving cavities are disposed outside of the cable connector receiving area and are adapted for the receipt of guide arms from a mating cable connector In one embodiment, the first electrical contact arrangement may be configured for data signals in accordance with the SATA standard. Alternatively, in another embodiment, the first electrical contact arrangement may be configured for power signals in accordance with the SATA standard.

In a more detailed embodiment, the PCB connector may include a second blade connector having a second electrical contact arrangement in accordance with the SATA standard. The second blade connector is also located inside of the cable connector receiving area of the housing. For example, in one embodiment, the first electrical contact arrangement may be configured for data signals in accordance with the SATA standard and the second electrical contact arrangement may be configured for power signals in accordance with the SATA standard.

In an even more detailed embodiment, the PCB connector may include substantially thickened strengthening walls disposed between the cable connector receiving area and the guide arm receiving cavities, respectively. At least one of the guide arm receiving cavities may include a conductive surface. For example, the conductive surface may include a grounding tab. In another embodiment, the housing and the guide arm receiving cavities may be made from a conductive plastic material. Further, the guide arm receiving cavities may be approximately rectangularly shaped or approximately oval shaped. Also, the guide arm receiving cavities may be differently sized. Additionally, the SATA standard may be a Serial Attached Small Computer System Interface (SAS) standard. Moreover, in further embodiments, the housing may optionally include a legacy Integrated Drive Electronics (IDE) power receptacle and/or a user section receptacle.

In an additional aspect, the invention may be regarded as a PCB connector for connection to a PCB, in which, the PCB connector includes a first blade connector for supporting a first electrical contact arrangement in accordance with the SATA standard, a second blade connector for supporting a second electrical contact arrangement in accordance with the SATA standard, a housing for enclosing the first and second blade connectors and the supported electrical contact arrangements, and at least one guide arm receiving cavity being integrally formed with the housing. The housing defines a cable connector receiving area around the first and second blade connectors for the receipt of at least one cable connector. Further, the guide arm receiving cavity is disposed outside of the cable receiving area and is adapted for the receipt of a guide arm from a mating cable connector.

In one embodiment, the first electrical contact arrangement may be configured for data signals in accordance with the SATA standard and the second electrical contact arrangement may be configured for power signals in accordance with the SATA standard.

In a more detailed embodiment, the PCB connector may include a substantially thickened strengthening wall disposed between the cable connector receiving area and the guide arm receiving cavity. The guide arm receiving cavity may include a conductive surface. For example, the conductive surface may include a grounding tab. In another embodiment, the housing and the guide arm receiving cavity may be made from a conductive plastic material. Further, the guide arm receiving cavity may be approximately rectangularly shaped. Additionally, the SATA standard may be a Serial Attached Small Computer System Interface (SAS) standard. Moreover, in further embodiments, the housing may optionally include a legacy Integrated Drive Electronics (IDE) power receptacle and/or a user section receptacle.

In an additional aspect, the invention may be regarded as a PCB connector for connection to a PCB, in which, the PCB connector includes a first blade connector for supporting a first electrical contact arrangement in accordance with the SATA standard, a second blade connector for supporting a second electrical contact arrangement in accordance with the SATA standard, a housing for enclosing the first and second blade connectors and the supported electrical contact arrangements, and a pair of laterally-opposed guide arm receiving cavities being integrally formed with the housing. The housing defines a cable connector receiving area around the first and second blade connectors for the receipt of at least one cable connector. Further, the guide arm receiving cavities are disposed outside of the cable receiving area and are adapted for the receipt of guide arms from a mating cable connector.

In one embodiment, the first electrical contact arrangement may be configured for data signals in accordance with the SATA standard and the second electrical contact arrangement may be configured for power signals in accordance with the SATA standard.

In a more detailed embodiment, the PCB connector may include substantially thickened strengthening walls disposed between the cable connector receiving area and the guide arm receiving cavities, respectively. At least one of the guide arm receiving cavities may include a conductive surface. For example, the conductive surface may include a grounding tab. In another embodiment, the housing and the guide arm receiving cavities may be made from a conductive plastic material. Further, the guide arm receiving cavities may be approximately rectangularly shaped or approximately oval shaped. Also, the guide arm receiving cavities may be differently sized. Additionally, the SATA standard may be a Serial Attached Small Computer System Interface (SAS) standard. Moreover, in further embodiments, the housing may optionally include a legacy Integrated Drive Electronics (IDE) power receptacle and/or a user section receptacle.

The foregoing and other features of the invention are described in detail below and set forth in the appended claims.

DETAILED DESCRIPTION

Figure 1A:
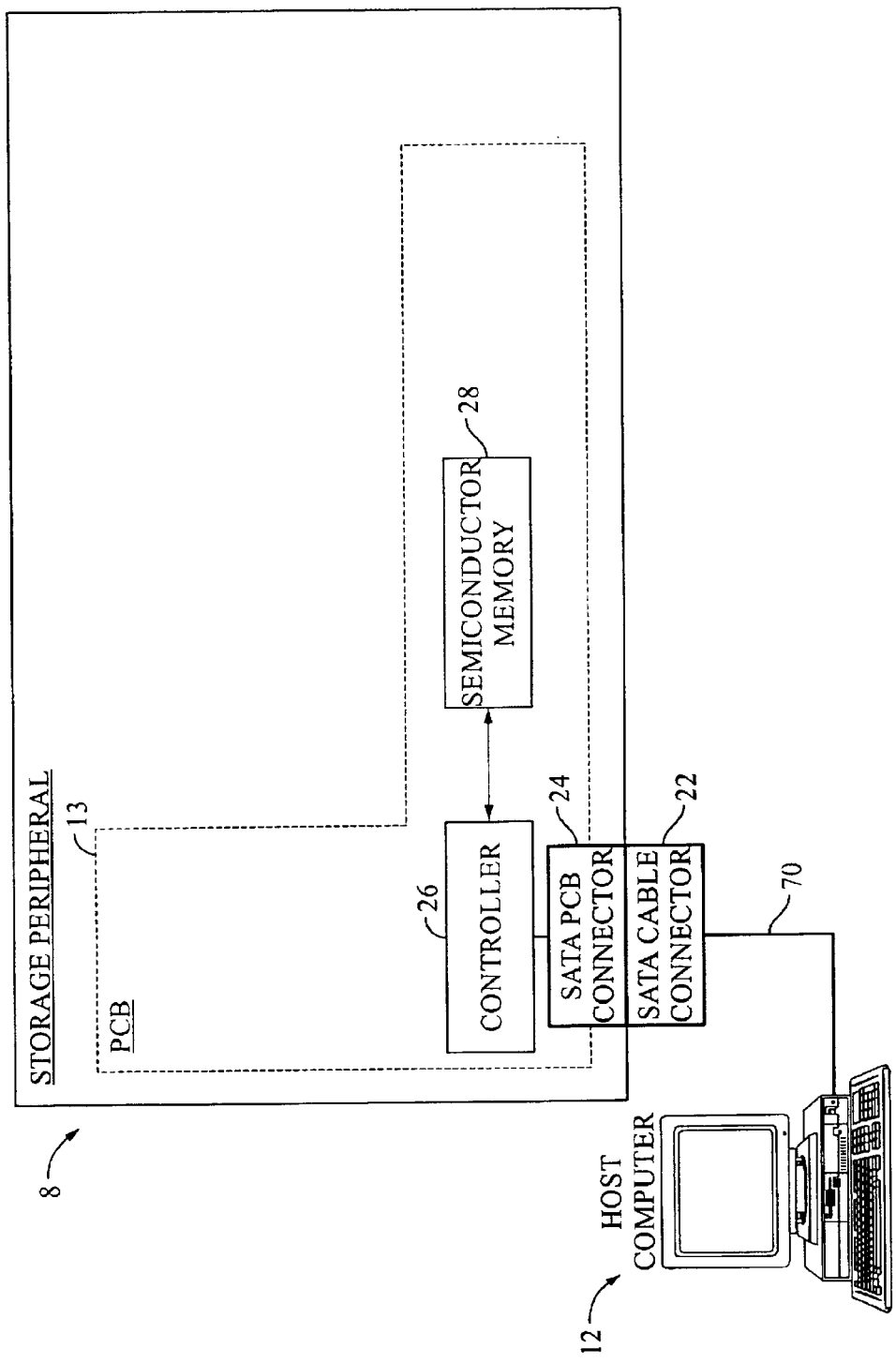
FIG. 1A shows a block diagram of a system including a host computer connected to a storage peripheral, in which embodiments of the invention may be practiced.

With reference to FIG. 1A, FIG. 1A shows a block diagram of a system including a host computer 12 connected to a storage peripheral 8, in which embodiments of the invention may be practiced. The storage peripheral 8 comprises a controller 26 having a Serial ATA (SATA) interface (not shown) connected to a SATA PCB connector 24. The storage peripheral 8 further includes a semiconductor memory 28 for data storage and retrieval. The controller 26, semiconductor memory 28, and SATA PCB connector 24 are preferably mounted on a printed circuit board (PCB) 13. The storage peripheral 8 is connectable to a host computer 12 for receiving commands and data over a SATA cable 70 having a SATA cable connector 22.

In one embodiment, storage peripheral 8 may emulate a disk drive while communicating with the host computer 12 using a SATA protocol. Semiconductor memory 28 may be a Flash memory system for providing non-volatile storage. In another embodiment, semiconductor memory 28 may be a large DRAM array suitable for caching data in a high performance system.

Figure 1B:
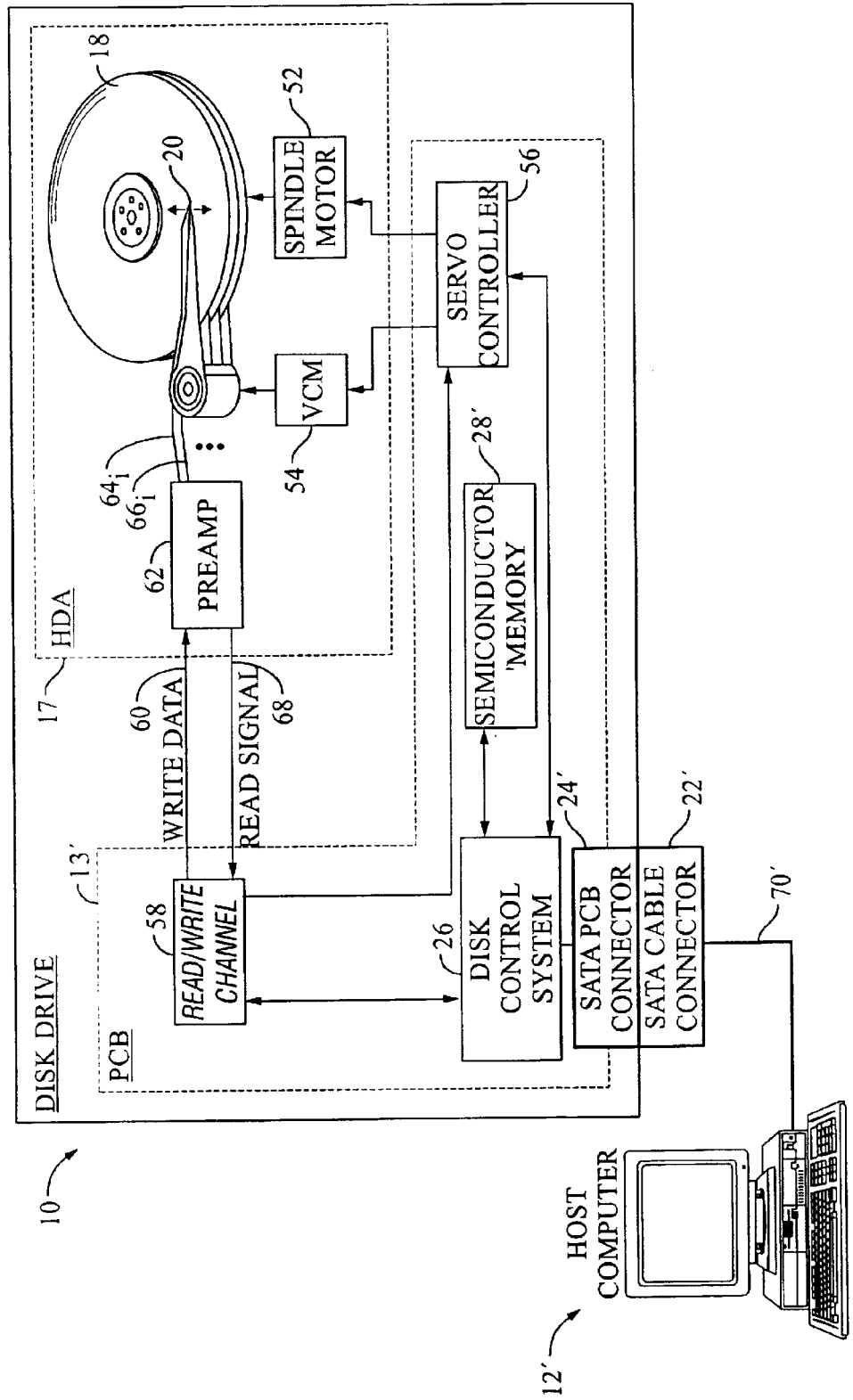
FIG. 1B shows a block diagram of a system including a host computer connected to a disk drive, in which embodiments of the invention may be practiced.

With reference to FIG. 1B, FIG. 1B shows a block diagram of a system including a host computer 12' connected to a disk drive 10, in which embodiments of the invention may be practiced. In this embodiment, the disk drive 10 acts as the storage peripheral. The disk drive 10 includes a head disk assembly (HDA) 17 having a disk 18 and a transducer head 20 actuated radially over the disk. The disk drive 10 further includes a disk control system 25, which may include a SATA interface (not shown), and a serial ATA (SATA) PCB connector 24'. The disk control system 25 responds to disk-drive commands and accesses data storage locations on the disk 18 through the transducer head 20. The SATA PCB connector 24' couples the disk control system 25 to the host computer 12' when the disk drive 10 is connected to the host computer 12' via the SATA cable 70' and the SATA cable connector 22'.

The HDA 17 of disk drive 10 further includes a spindle motor 52 for rotating the disk 18 and a voice coil motor (VCM) 54 for actuating the transducer head 20 radially over the disk 18. A servo controller 56 generates the appropriate control signals applied to the spindle motor 52 and the VCM 54 in response to commands received from the disk control system 25. During a write operation the disk control system 25 transmits user data received from the host computer 12' to a read/write channel 58. The read/write channel 58 performs appropriate encoding of the user data to generate write data 60 written to the disk 18. The write data 60 modulates the operation of a preamp 62 to generate a write signal 64, applied to the head 20 in order to write magnetic transitions onto the surface of the disk 18. During a read operation, the head 20 detects the magnetic transitions representing the recorded data to generate a read signal 66, which is amplified by the preamp 62 to generate a read signal 68 applied to the read/write channel 58. The read/write channel 58 demodulates the read signal 68 into user data transmitted to the host computer 12' via disk control system 25 after correcting errors.

The disk drive 10 communicates with the host computer 12' over a SATA cable 70' that includes a SATA cable connector 22' connected to the SATA PCB connector 24' using a communication protocol defined by an industry standard such as the Serial ATA standard 1.0. In another embodiment, the disk drive may communicate with the host computer using an industry standard known as Serial Attached SCSI (SAS), which contemplates using cabling and circuitry originally defined in the SATA standard.

The disk 18, spindle motor 52, VCM 54, preamp 62, and related hardware may be integrated into the HDA 17. The disk control system 25, SATA PCB connector 24', semiconductor memory 28', servo controller 56, read/write channel 58, and related electronics may be mounted on a printed circuit board (PCB) 13'. The disk control system 25 generally includes circuitry and processors that control the HDA 17 and that provide an intelligent control interface between the host computer 12' and the HDA for execution of disk-drive commands. The disk control system 25 may have an internal microprocessor and nonvolatile memory for implementing the techniques of the invention. The semiconductor memory 28' may have nonvolatile memory and volatile random access memory (RAM).

The following discussion will describe embodiments of the invention related to SATA cable connectors 22,22', SATA PCB connectors 24,24' connected to PCBs 13,13', SATA cables 70,70', etc. It should be appreciated that the following description of SATA cable connectors, SATA PCB connectors, and SATA cables is applicable to either of the system environments of FIGS. 1A and 1B for a storage peripheral 8 or a disk drive 10, respectively, both of which have been previously described in detail, as well as other types of system environments. Moreover, it should be appreciated that embodiments of the SATA PCB connectors 24 can similarly be connected to PCBs associated with a host computer or back-plane such that SATA cable connectors 22 can be connected to these PCB connectors and an interface can be provided at the host computer or back-plane end.

Figure 2:
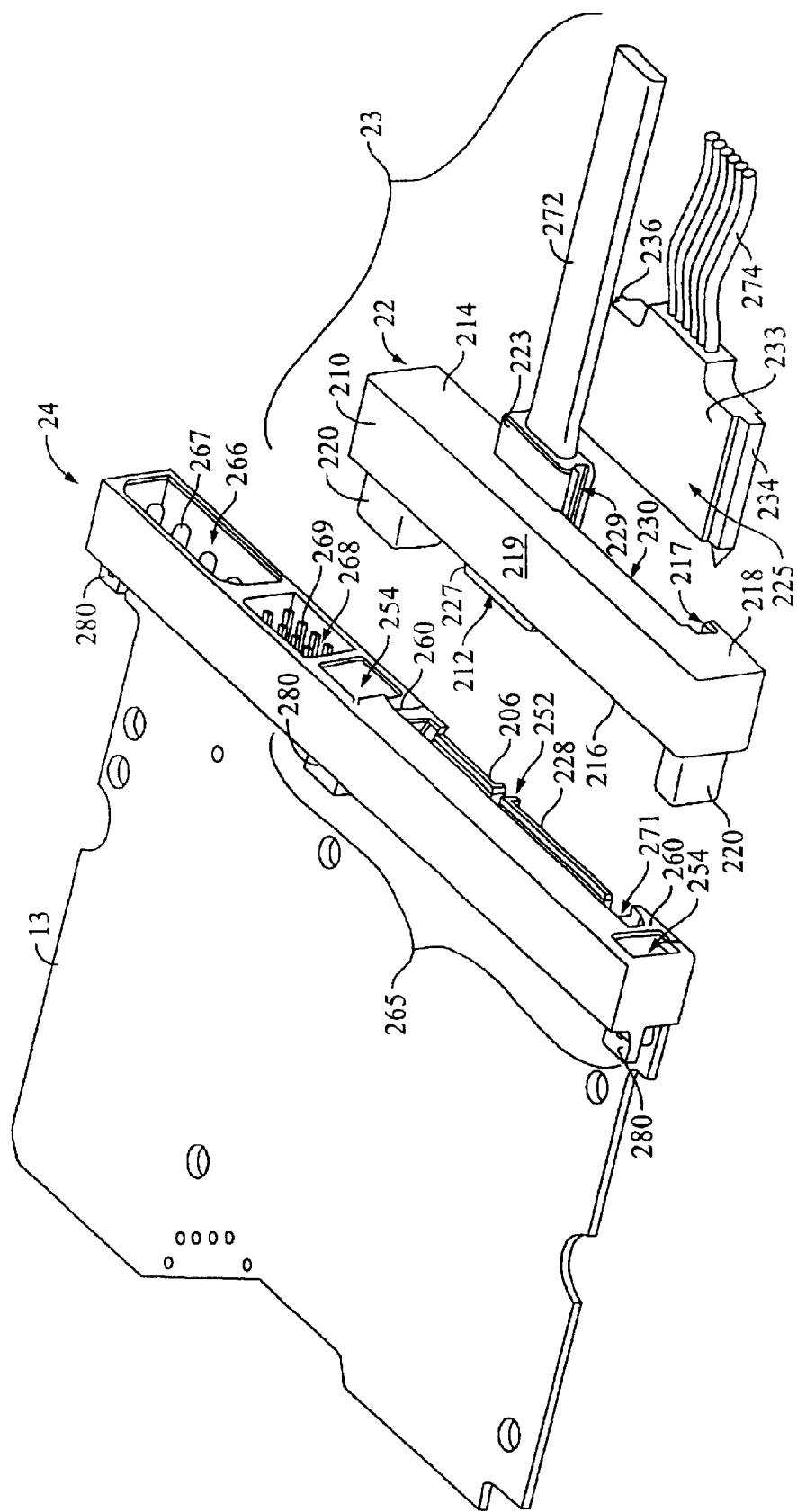
FIG. 2 shows a perspective view of a cable connector for mating to a PCB connector connected to a PCB, according to one embodiment of the invention.
Figure 3A:
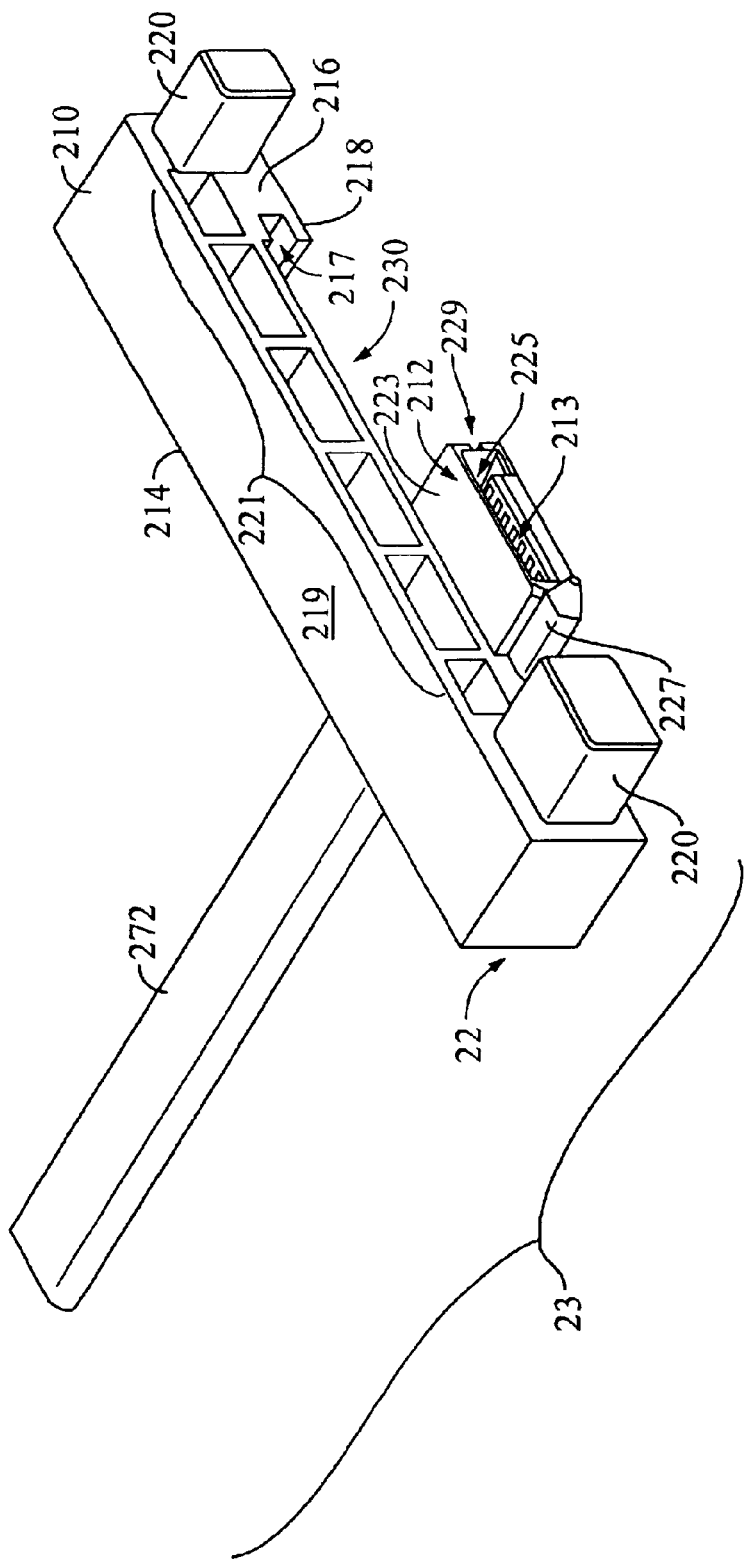
FIG. 3A shows a perspective view of a cable connector having a first blade-receiving portion that includes a first electrical contact arrangement configured for data signals in accordance with a SATA standard, according to one embodiment of the invention.

With reference now to FIGS. 2 and 3A, FIG. 2 shows a perspective view of a cable connector 22 for mating to a PCB connector 24 connected to a PCB 13 and FIG. 3A shows another perspective view of the cable connector 22 having a first blade-receiving portion 212 that includes a first electrical contact arrangement 213 configured in accordance with a SATA standard. The first electrical contact arrangement 213 of the first blade-receiving portion 212 is configured to mate with a first blade connector 206 of the PCB connector having a second electrical contact arrangement (not shown) also in accordance with the SATA standard.

Particularly, in one embodiment, the cable connector 22 includes a first blade-receiving portion 212 for enclosing the first electrical contact arrangement 213, a housing 210 for supporting the first blade-receiving portion 212, and at least one guide arm 220 that is integrally formed with the housing. In one embodiment, a pair of laterally-opposed guide arms 220 are integrally formed with the housing. Also, in one embodiment, a connector-support gap 230 is formed in the housing 210 for receiving a second blade-receiving portion 225. Further, the housing 210 has a cable entrance end 214 and a mating end 216.

At least one guide arm 220 projects from the mating end 216 of the housing 210 and is disposed outside of and is separate from the first blade-receiving portion 212. Further, in one embodiment, a pair of laterally-opposed guide arms 220 project from the mating end 216 of the housing 210 and are disposed outside of and are separate from the first blade-receiving portion 212.

Also, in one embodiment, a first shielded cable 272 having a first plurality of conductors configured in accordance with the SATA standard may be connected to the first blade-receiving portion 212. The first plurality of conductors are connected to the first electrical contact arrangement of the first blade-receiving portion 212. The combination of the cable connector 22 including the first blade-receiving portion 212 and the first shielded cable 272 connected thereto may be referred to as cable assembly 23.

The housing 210 of the cable connector 22 is approximately U-shaped and has the connector-support gap 230 formed therein. The pair of laterally-opposed guide arms 220 project from the mating end 216 of the housing 210 and are disposed outside of and are separate from the first blade-receiving portion 212 and the connector-support gap 230. The housing 210 includes a guide slot 217 in one of two opposite sidewalls 218 of the housing that aids in defining the connector-support gap 230. Further, the top portion 219 of the housing may optionally have rectangular recesses 221.

In one embodiment, the first electrical contact arrangement 213 of the first blade-receiving portion 212 is configured for data signals in accordance with the SATA standard and is particularly configured to mate with the first blade connector 206 of the PCB connector 24 having a second electrical contact arrangement (not shown) also configured for data signals in accordance with the SATA standard. Further, the first shielded cable 272 having a plurality of conductors is configured for data signals in accordance with the SATA standard and is coupled to the data blade-receiving portion 212. The plurality of conductors of the first shielded cable 272 are connected to the data electrical contact arrangement 213 of the data blade-receiving portion 212.

The data blade-receiving portion 212 includes a generally oblong rectangular housing 223 for enclosing the data electrical contact arrangement 213 configured in accordance with the SATA standard. At one end, the data blade-receiving portion 212 includes an L-shaped opening 225 for receipt of the corresponding L-shaped data blade connector 206 of the PCB connector 24 which has a mating data electrical contact arrangement configured in accordance with the SATA standard such that the data blade connector 206 properly mates with the data electrical contact arrangement 213 of the data blade-receiving portion 212. At the other end, the data blade-receiving portion 212 receives the shielded cable 272 having a plurality of conductors configured for data signals in accordance with the SATA standard and the plurality of conductors are connected to the data electrical contact arrangement 213 inside the housing 223 of the data blade-receiving portion 212.

Further, the data blade-receiving portion 212 includes a side guide rail 227 to mate with the PCB connector 24, as will be discussed in detail later. Also, the data blade-receiving portion 212 further includes a side guide slot 229 for receipt of a guide rail 236 of the second blade-receiving portion 225, as will be discussed. The data blade-receiving portion 212 may be integrally molded with the housing 210.

It should be appreciated that, in an alternative embodiment, the first electrical contact arrangement of the first blade-receiving portion may be configured for power signals in accordance with the SATA standard and would instead mate with a blade connector of the PCB connector likewise having an electrical contact arrangement configured for power signals in accordance with the SATA standard. Further, the first shielded cable having a plurality of conductors would be configured for power signals in accordance with the SATA standard. The plurality of conductors of the first shielded cable would connected to the power electrical contact arrangement of the power blade-receiving portion.

Figure 4A:
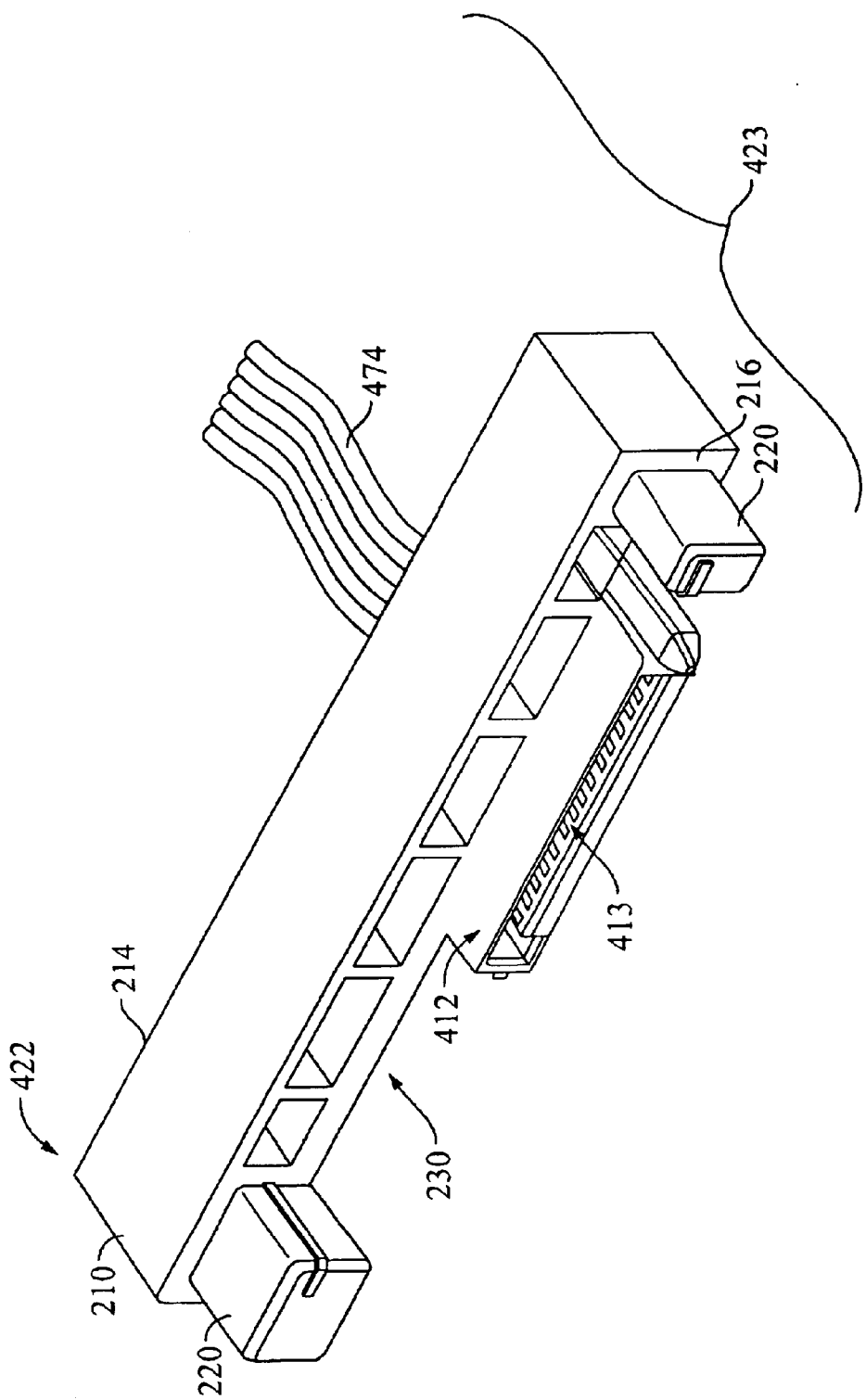
FIG. 4A shows a perspective view of another embodiment of a cable connector configured for power signals in accordance with the SATA standard, according to one embodiment of the invention.

An example of this can be seen with reference to FIG. 4A. FIG. 4A shows an alternative embodiment of a cable connector 422 including a first blade-receiving portion 412 having a first electrical contact arrangement 413 configured for power signals in accordance with the SATA standard and which is configured to mate with a blade connector of a PCB connector likewise having an electrical contact arrangement configured for power signals in accordance with the SATA standard. Further, the first shielded cable 474 has a plurality of conductors configured for power signals in accordance with the SATA standard. The plurality of conductors of the first shielded cable 474 are connected to the power electrical contact arrangement 413 of the power blade-receiving portion 412. The combination of the power cable connector 422 including the first blade-receiving portion 412 having the first electrical contact arrangement 413 configured for power signals and the first shielded cable 474 configured for power signals connected thereto may be referred to as cable assembly 423. The blade-receiving portion configured for power signals in accordance with the SATA standard will be discussed in detail later.

Continuing with reference to FIG. 2 as well as with reference to FIG. 3B, which shows a second blade-receiving portion 225, the use of a second blade-receiving portion will now be described. As previously discussed, a connector-support gap 230 is formed in the housing 210 for receiving a second blade-receiving portion 225. The second blade-receiving portion 225 supports a third electrical contact arrangement 232 to mate with a second blade connector 228 having a fourth electrical contact arrangement (not shown) in accordance with the SATA standard.

In one embodiment, the third electrical contact arrangement 232 is configured for power signals in accordance with the SATA standard and is configured to mate with the second blade connector 228 of the PCB connector 24 having a fourth electrical contact arrangement (not shown) also configured for power signals in accordance with the SATA standard. Particularly, in this embodiment, the cable connector 22 includes a second blade-receiving portion 225 for enclosing the power electrical contact arrangement 232. Further, a shielded cable 274 having a plurality of conductors configured for power signals in accordance with the SATA standard is coupled to the power blade-receiving portion 225 and the plurality of conductors are connected to the power electrical contact arrangement 232 of the power blade-receiving portion 225 inside the power blade-receiving portion. In this embodiment, the combination of the cable connector 22 including the data and power blade-receiving portions 212,225 and their respective first and second shielded cables 272,274 (i.e. data and power shielded cables) connected thereto, may be referred to as cable assembly 23.

Figure 3B:
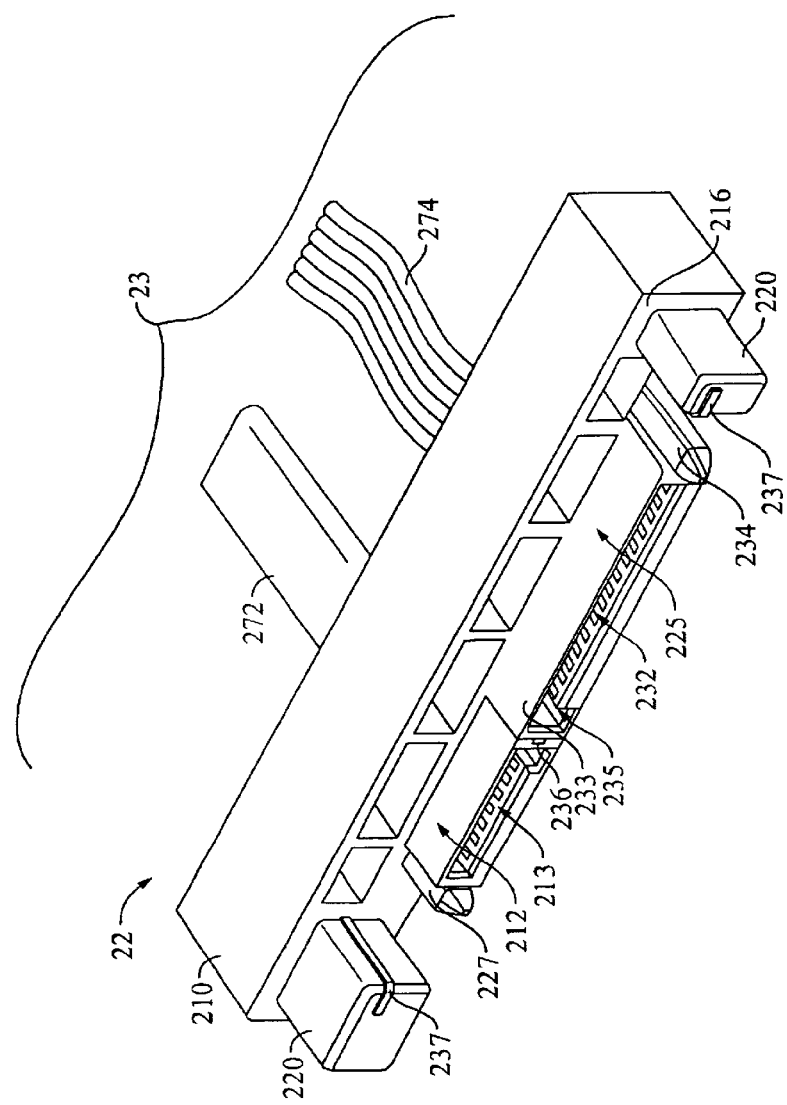
FIG. 3B shows a perspective view of a cable connector having a first blade-receiving portion configured for data signals in accordance with the SATA standard and a second blade-receiving portion configured for power signals in accordance with the SATA standard, according to one embodiment of the invention.

For example, in this embodiment, as shown in FIGS. 2 and 3B, the first electrical contact arrangement 213 of the first blade-receiving portion 212 and the first shielded cable 272 may be configured for data signals in accordance with the SATA standard to mate with the first blade connector 206 of the PCB connector 24 having a second electrical contact arrangement similarly configured for data signals in accordance with the SATA standard and the third electrical contact arrangement 232 of the second blade-receiving portion 225 and the second shielded cable 274 may be configured for power signals in accordance with the SATA standard to mate with the second blade connector 228 of the PCB connector 24 having a fourth electrical contact arrangement similarly configured for power signals in accordance with the SATA standard. Accordingly, the data blade-receiving portion 212 mates with the data blade connector 206 of the PCB connector 24 and the power blade-receiving portion 225 mates with the power blade connector 228 of the PCB connector 24, respectively.

Looking particularly at the power blade-receiving portion 225, the power blade-receiving portion 225 includes a generally rectangular housing 233 for enclosing the power electrical contact arrangement 232 configured in accordance with the SATA standard. At one end, the power blade-receiving portion 225 includes an L-shaped opening 235 for receipt of the corresponding L-shaped power blade connector 228 of the PCB connector 24, which has a mating power electrical contact arrangement configured in accordance with the SATA standard, such that the power blade connector 228 of the PCB connector 24 properly mates with the power electrical contact arrangement 232 of the power blade-receiving portion 225. At the other end, the power blade-receiving portion 225 receives shielded cable 274 having a plurality of conductors configured for power signals in accordance with the SATA standard and the plurality of conductors are connected to the power electrical contact arrangement 232 inside the housing 233 of the power blade-receiving portion 225.

Further, the power blade-receiving portion 225 includes a pair of side guide rails. A first guide rail 234 mates with the opposed guide slot 217 of the housing 210 such that the power blade-receiving portion 225 interlocks with the housing 210 of the cable connector 22 and a second slender rectangular guide rail 236 mates with the side guide slot 229 of the data blade-receiving portion 212 and interlocks with the data blade-receiving portion. In this way, by the power blade-receiving portion 225 interlocking with the housing 210 and the data blade-receiving portion 212, an integral cable connector 22 is formed. Alternatively, in another embodiment, the data blade-receiving portion 212 and the power blade-receiving portion 225 may be integrally molded with the housing 210.

Continuing with reference to FIGS. 2 and 3B, the pair of laterally-opposed guide arms 220 will now be discussed. As previously described, the guide arms 220 project from the mating end 216 of the housing 210 of the cable connector 22 and are disposed outside of and are separate from the first blade-receiving portion 212 and the connector-support gap 230. In one embodiment, the guide arms 220 are approximately rectangularly shaped as particularly shown in FIG. 3B. Further, as shown in FIG. 3B, the guide arms 220 may be differently sized.

In one embodiment each of the guide arms 220 may include a conductive contact 237 such as a grounding clip. As will be described in more detail later, the conductive contacts may provide pre-grounding functionality for one of the data or power blade-receiving portions or both. For example, one of the conductive contacts 237 of a one of the guide arms may be coupled to a ground conductor of the first shielded cable 272 (e.g. configured for data signals) and the other conductive contact 237 of the other guide arm may be coupled to a ground conductor of the second shielded cable 274 (e.g. configured for power signals), as will be discussed. Various other grounding configurations for pre-grounding and the dissipation of electro-static discharge (ESD) will also be discussed.

Also, in one embodiment, the housing 210 and the guide arms 220 may be made from a conductive plastic material such that the cable connector 22 is conductive. For example, the plastic material may include a conductive filler material. This may be referred to as the conductive cable connector embodiment.

Figure 3C:
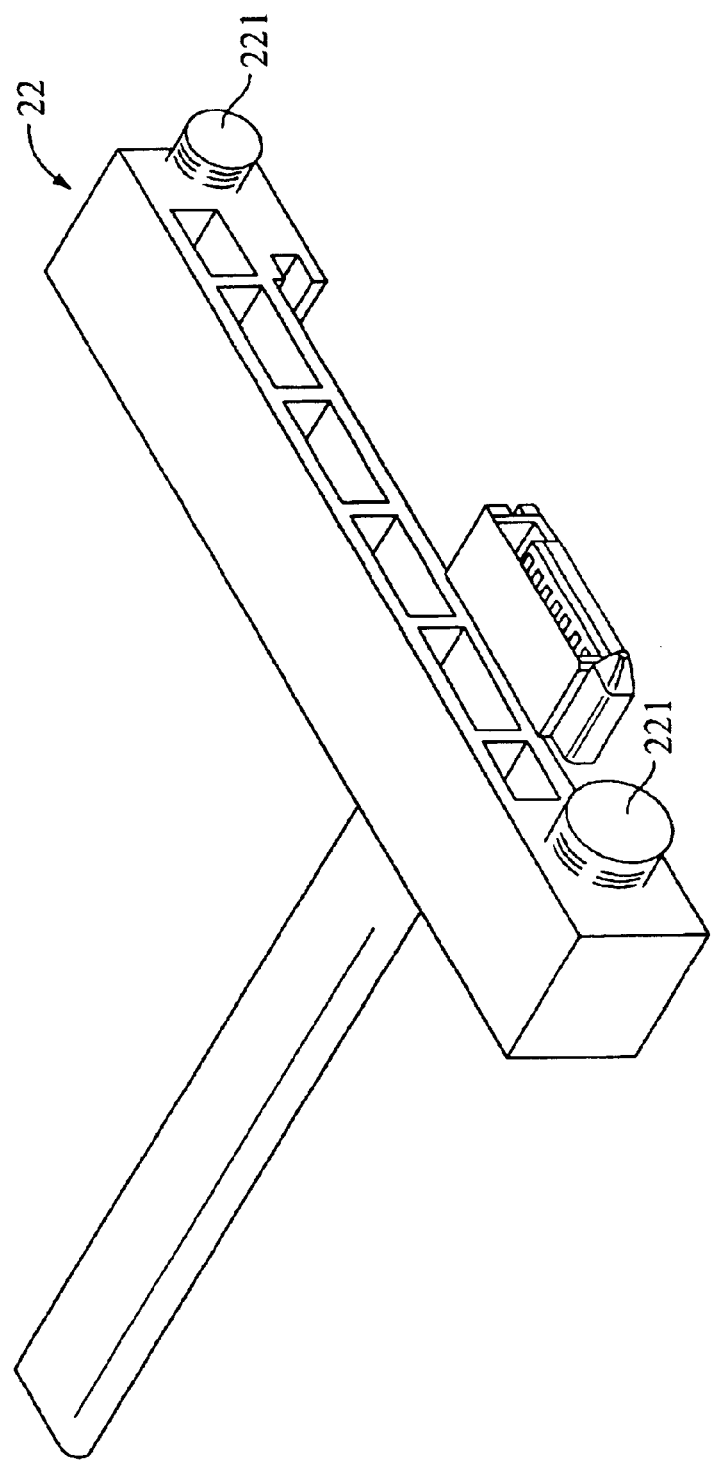
FIG. 3C shows a perspective view of a cable connector having guide arms that are approximately oval shaped, according to one embodiment of the invention.

With reference now to FIG. 3C, in another embodiment, the guide arms 221 may be approximately oval shaped. Again, as previously described, the guide arms 221 may be differently sized. Further, although not shown in FIG. 3C, each oval shaped guide arm 221 may also include a conductive contact such as a grounding clip.

Figure 4B:
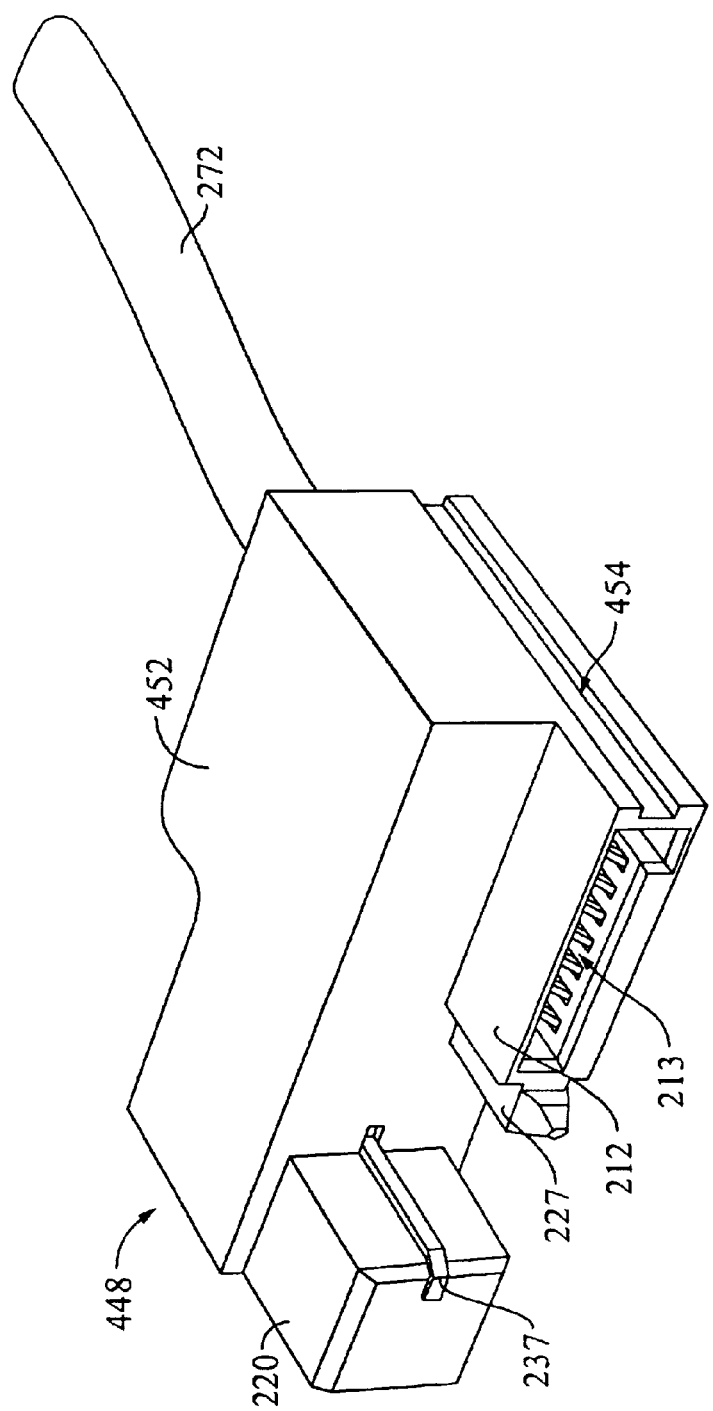
FIG. 4B shows a perspective view of another embodiment of a cable connector configured for data signals in accordance with the SATA standard, according to one embodiment of the invention.

Various other alternative embodiments of the previously described cable connectors are also possible. For example, as shown in FIG. 4B, in one embodiment, a cable connector 448 utilized only for data signal connection is shown. The data cable connector 448 may include a housing 452 for supporting a data blade-receiving portion 212 having an electrical contact arrangement 213 configured for data signals in accordance with the SATA standard. The data blade-receiving portion 212 may be integrally molded with the housing 452. Further, in this embodiment, the data cable connector 448 only includes one guide arm 220. The guide arm 220 is integrally formed with the housing 452 and projects from the mating end of the housing and is disposed outside of and is separate from the data blade-receiving portion 212. The guide arm includes a conductive contact 237, such as a grounding clip. Alternatively, as previously discussed, the housing 452 and the guide arm 220 may be made from a conductive plastic material.

The data electrical contact arrangement 213 of the data blade-receiving portion 212 is configured to mate with the data blade connector 206 of the PCB connector 24 having an electrical contact arrangement also configured for data signals in accordance with the SATA standard. Further, a shielded cable 272 having a plurality of conductors configured for data signals in accordance with the SATA standard is coupled to the data blade-receiving portion 212 and the plurality of conductors are connected to the data electrical contact arrangement 213 of the data blade-receiving portion 212 inside the data blade-receiving portion. As previously discussed, the conductive contact 237 of the guide arm 220 may be coupled to a ground conductor of the shielded cable 272 (e.g. configured for data signals) for pre-grounding. The rectangular guide arm 220 is suitably formed for receipt by a guide arm receiving cavity of the PCB connector 24, as will be discussed. Also, the SATA standard utilized may be a SAS standard.

Further, the housing 452 may include a side guide slot 454 for mating with a rectangular guide rail of another separate power cable connector, as will be discussed.

Figure 4C:
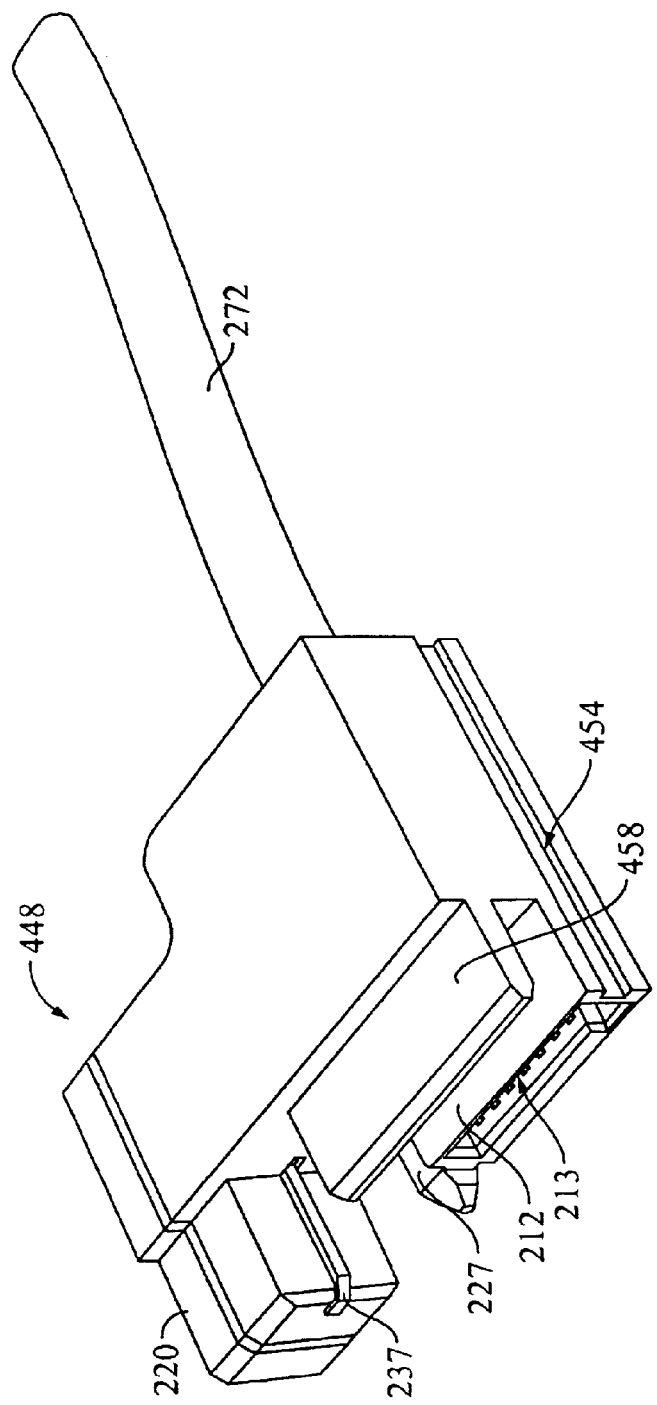
FIG. 4C shows a perspective view of another embodiment of a cable connector configured for data signals in accordance with the SATA standard, according to one embodiment of the invention.

Also, with reference to FIG. 4C, an alternative embodiment of the data cable connector 448 is shown. In this embodiment, the data cable connector 448 includes a second guide arm 458 that is shaped as an elongated tongue. The second elongated tongue guide arm 458 is suitably formed for receipt by a guide arm receiving cavity of the PCB connector 24 that is shaped as elongated slot, as will be discussed.

Figure 4D:
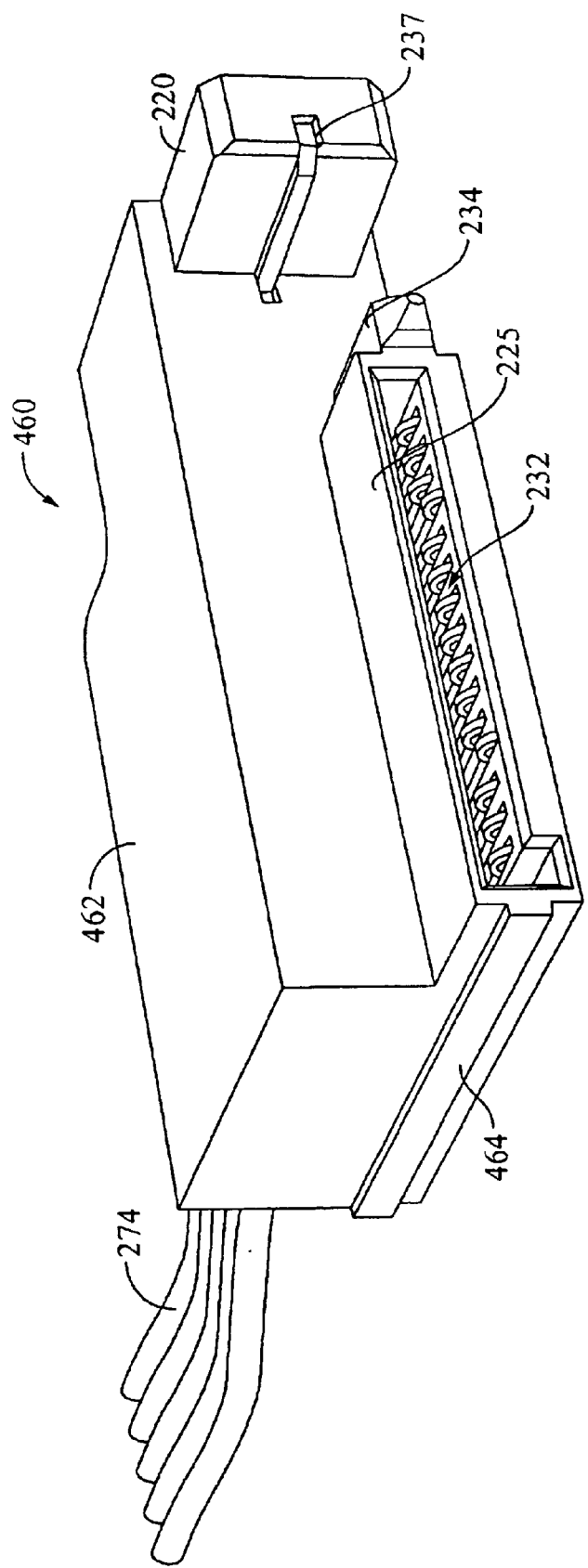
FIG. 4D shows a perspective view of another embodiment of a cable connector configured for power signals in accordance with the SATA standard, according to one embodiment of the invention.

Another alternative embodiment of the previously described cable connectors is shown in FIG. 4D. FIG. 4D shows a cable connector 460 that is utilized only for power signal connection. The power cable connector 460 may include a housing 462 for supporting a power blade-receiving portion 225 having an electrical contact arrangement 232 configured for power signals in accordance with the SATA standard. The power blade-receiving portion 225 may be integrally molded with the housing 462. Further, in this embodiment, the power cable connector 460 only includes one guide arm 220. The guide arm 220 is integrally formed with the housing 462 and projects from the mating end of the housing and is disposed outside of and is separate from the power blade-receiving portion 225. The guide arm includes a conductive contact 237, such as a grounding clip. Alternatively, as previously discussed, the housing 462 and the guide arm 220 may be made from a conductive plastic material.

The power electrical contact arrangement 232 of the power blade-receiving portion 225 is configured to mate with the power blade connector 228 of the PCB connector 24 having an electrical contact arrangement also configured for power signals in accordance with the SATA standard. Further, a shielded cable 274 having a plurality of conductors configured for power signals in accordance with the SATA standard is coupled to the power blade-receiving portion 225 and the plurality of conductors are connected to the power electrical contact arrangement 232 of the power blade-receiving portion 225 inside the power blade-receiving portion. As previously discussed, the conductive contact 237 of the guide arm 220 may be coupled to a ground conductor of the shielded power cable 274 (e.g. configured for power signals) for pre-grounding. The rectangular guide arm 220 is suitably formed for receipt by a guide arm receiving cavity of the PCB connector 24, as will be discussed. Also, the SATA standard utilized may be a SAS standard.

Further, the housing 462 may include a side guide rail 464 for mating with side guide slot 454 of the data cable connector 448.

Figure 4E:
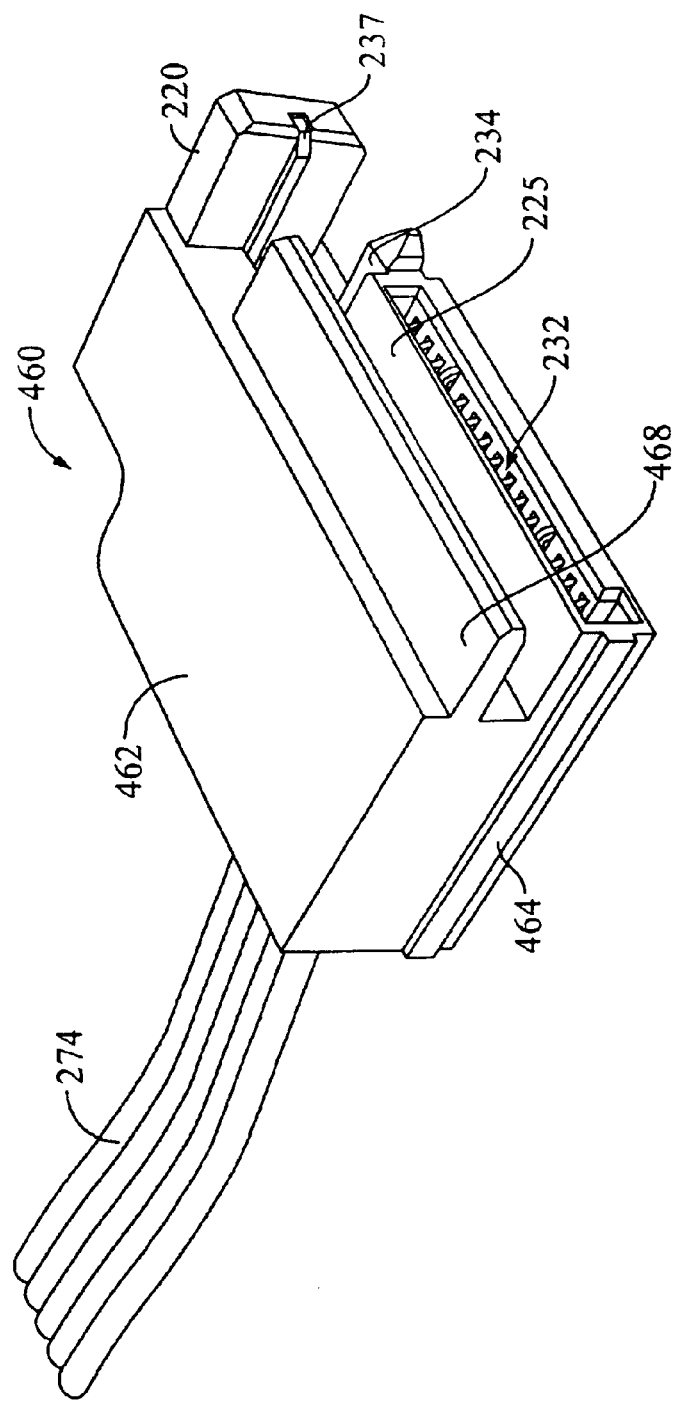
FIG. 4E shows a perspective view of another embodiment of a cable connector configured for power signals in accordance with the SATA standard, according to one embodiment of the invention.

Also, with reference to FIG. 4E, an alternative embodiment of the power cable connector 460 is shown. In this embodiment, the power cable connector 460 includes a second guide arm 468 that is shaped as an elongated tongue. The second elongated tongue guide arm 468 is suitably formed for receipt by a guide arm receiving cavity of the PCB connector 24 that is shaped as elongated slot, as will be discussed.

Figure 4F:
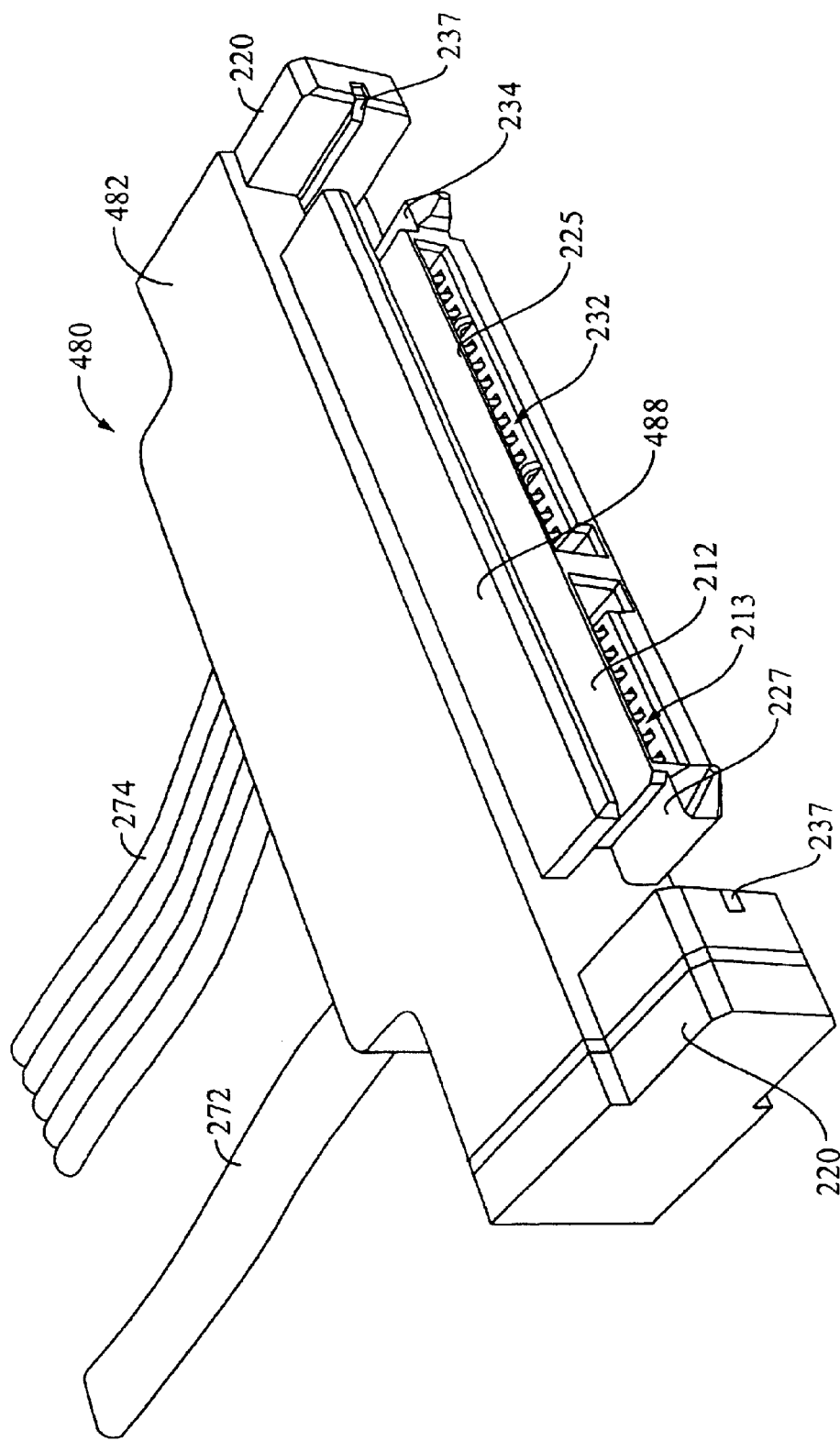
FIG. 4F shows a perspective view of another embodiment of a cable connector configured for both data and power signals in accordance with the SATA standard, according to one embodiment of the invention.

An additional alternative embodiment of the previously described cable connectors is shown in FIG. 4F. FIG. 4F shows a combined cable connector 480 that is utilized for both data and power signal connection and is a combination of the data cable connector 448 and the power cable connector 460, previously discussed. The combined cable connector 480 may be formed by the combination of the power and data cable connectors 460,448, previously discussed, by the side guide rail 464 of the power cable connector mating with the side guide slot 454 of the data cable connector 448 to form the combined cable connector 480. Alternatively, the combined cable connector 480 may be formed by the integral molding of the previously described power and data cable connectors 460,448, respectively.

The combined cable connector 480 may include a housing 482 for supporting both the data blade-receiving portion 212 having an electrical contact arrangement 213 configured for data signals in accordance with the SATA standard and a power blade-receiving portion 225 having an electrical contact arrangement 232 configured for power signals in accordance with the SATA standard. In this embodiment, a pair of laterally-opposed guide arms 220 are integrally formed with the housing 482 and project from the mating end of the housing and are disposed outside of and are separate from both the data and power blade-receiving portions 212,225. The guide arms each include a conductive contact 237, such as a grounding clip. Alternatively, as previously discussed, the housing 482 and the guide arms 220 may be made from a conductive plastic material.

The data electrical contact arrangement 213 of the data blade-receiving portion 212 is configured to mate with the data blade connector 206 of the PCB connector 24 having an electrical contact arrangement also configured for data signals in accordance with the SATA standard. Further, a shielded cable 272 having a plurality of conductors configured for data signals in accordance with the SATA standard is coupled to the data blade-receiving portion 212 and the plurality of conductors are connected to the data electrical contact arrangement 213 of the data blade-receiving portion 212 inside the data blade-receiving portion. As previously discussed, the conductive contact 237 of the guide arm 220 may be coupled to a ground conductor of the shielded data cable 272 (e.g. configured for data signals) for pre-grounding. The power electrical contact arrangement 232 of the power blade-receiving portion 225 is configured to mate with the power blade connector 228 of the PCB connector 24 having an electrical contact arrangement also configured for power signals in accordance with the SATA standard. Further, a shielded cable 274 having a plurality of conductors configured for power signals in accordance with the SATA standard is coupled to the power blade-receiving portion 225 and the plurality of conductors are connected to the power electrical contact arrangement 232 of the power blade-receiving portion 225 inside the power blade-receiving portion. As previously discussed, the conductive contact 237 of the guide arm 220 may be coupled to a ground conductor of the shielded power cable 274 (e.g. configured for power signals) for pre-grounding.

The rectangular guide arms 220 are suitably formed for receipt by guide arm receiving cavities of the PCB connector 24, as will be discussed. Also, the SATA standard utilized may be a SAS standard. Further, in this embodiment, the combined cable connector 480 includes a second guide arm 488 that is shaped as an elongated tongue. The second elongated tongue guide arm 488 is suitably formed for receipt by a guide arm receiving cavity of the PCB connector 24 that is shaped as elongated slot, as will be discussed.

Figure 5A:
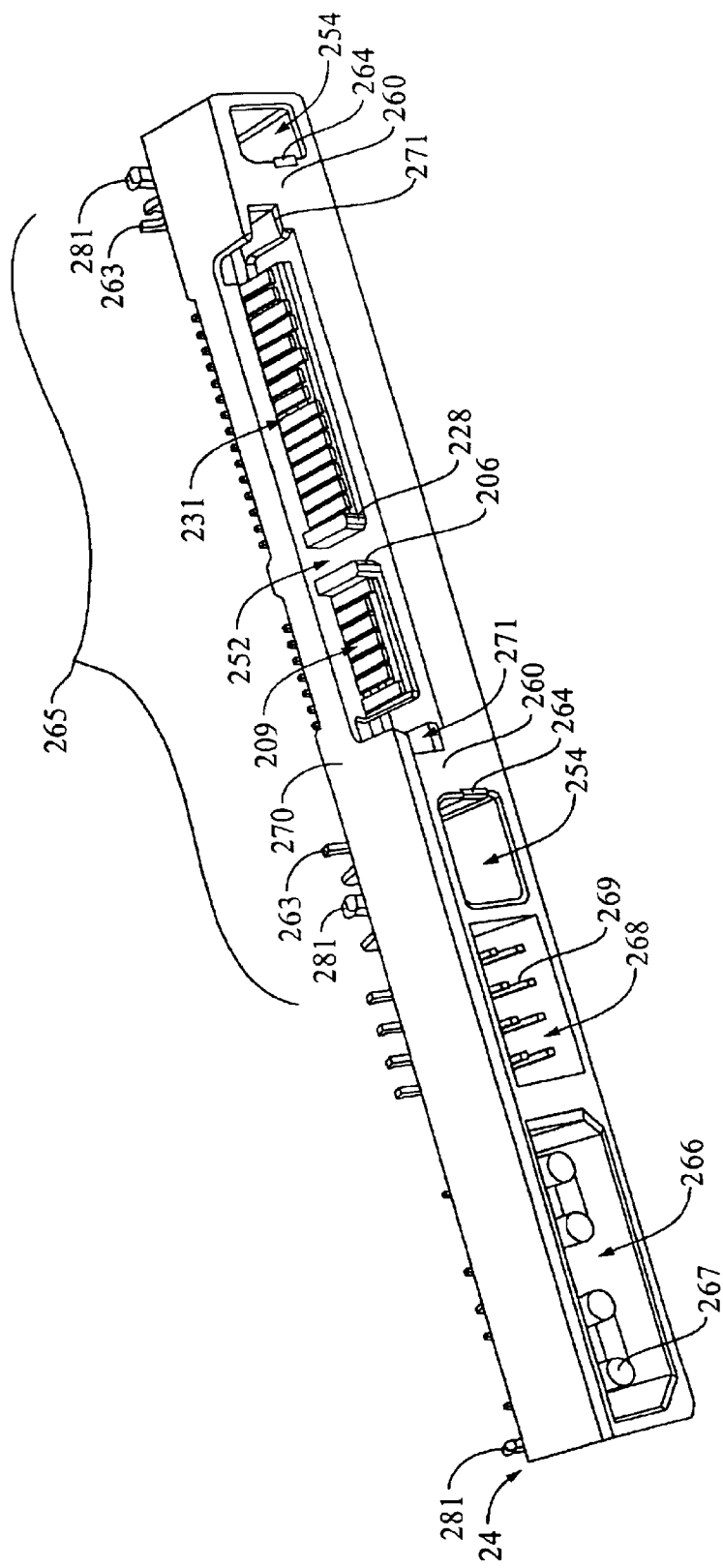
FIG. 5A shows a more detailed perspective view of the PCB connector of FIG. 2, according to one embodiment of the invention.

With reference now to FIG. 5A in conjunction with FIG. 2, one embodiment of the PCB connector 24 will now be described in detail. FIG. 5A shows a more detailed perspective view of the PCB connector 24 of FIG. 2. As shown in FIG. 2, the PCB connector 24 is mounted to a printed circuit board (PCB) 13. Mounting brackets 280 of the PCB connector 24 support the PCB 13 and mounting posts 281 extend from the mounting brackets 280 via through-holes of the PCB creating an interference fit to secure the PCB connector 24 to the PCB 13. Further, as will be discussed many pins of the various connectors are also fixed to the PCB 13 further securing the PCB connector 24 to the PCB 13.

In one embodiment, the PCB connector 24 includes a housing 270 having a SATA section 265, a legacy Integrated Drive Electronics (IDE) power section receptacle 266, and a user section receptacle 268. In other embodiments of the PCB connector 24, the housing 270 of the PCB connector 24 may only include the SATA section 265 and the legacy IDE power section receptacle 266 and the user section receptacle 268 may not be present. Particularly, looking at the SATA section 265, the PCB connector 24 includes a first blade connector 206 for supporting a first electrical contact arrangement 209 in accordance with a SATA standard, a second blade connector 228 for supporting a second electrical contact arrangement 231 in accordance with the SATA standard, and the housing 270 encloses the first and second blade connectors and the supported electrical contact arrangements. As should be appreciated, the electrical contacts of the electrical contact arrangements of the blade connectors 206 and 228 are mounted to the PCB 13 via through-holes of the PCB 13, for example. Alternatively, other methods of mounting the electrical contacts could be used, such as surface mount technologies.

In one embodiment, the housing 270 includes a pair of opposed guide slots 271 in each one of two opposite sidewalls of the housing 270 that define a cable connector receiving area 252 around the first and second blade connectors 206 and 228 for the receipt of at least one cable connector, respectively. The cable connector receiving area 252 is in accordance with the SATA standard. In one embodiment, the first electrical contact arrangement 209 of the first L-shaped blade connector 206 is configured for data signals in accordance with the SATA standard and a second electrical contact arrangement 231 of the second L-shaped blade connector 228 is configured for power signals in accordance with the SATA standard.

However, above and beyond the cable connector receiving area 252 as defined in accordance with the SATA standard, the housing 270 of the PCB connector 24 includes at least one guide arm receiving cavity 254 that is integrally formed with the housing 270 and that is disposed outside of the cable connector receiving area 252. In one embodiment, the housing 270 includes a pair of laterally-opposed guide arm receiving cavities 254 that are integrally formed with the housing 270 and that are disposed outside the cable connector receiving area 252. The guide arm receiving cavities 254 are adapted for the receipt of the guide arms 220 from the mating cable connector 22.

Further, in other embodiments, the guide arm receiving cavities 254 are adapted for the receipt of guide arms 220 from the other alternative embodiments of the mating cable connector 22 such as power signal only cable connector 422, data signal only cable connector 448, power signal only cable connector 460, and combined data and power signal cable connector 480. In the cases of power signal only cable connector 422 and combined data and power signal cable connector 480, these connectors both have two laterally-opposed guide arms both of which mate to the guide arm receiving cavities 254. In the cases of the data signal only cable connector 448 and power signal only cable connector 460, these connectors each have only one guide arm for mating with one of the respective guide arm receiving cavities 254.

Figure 5B:
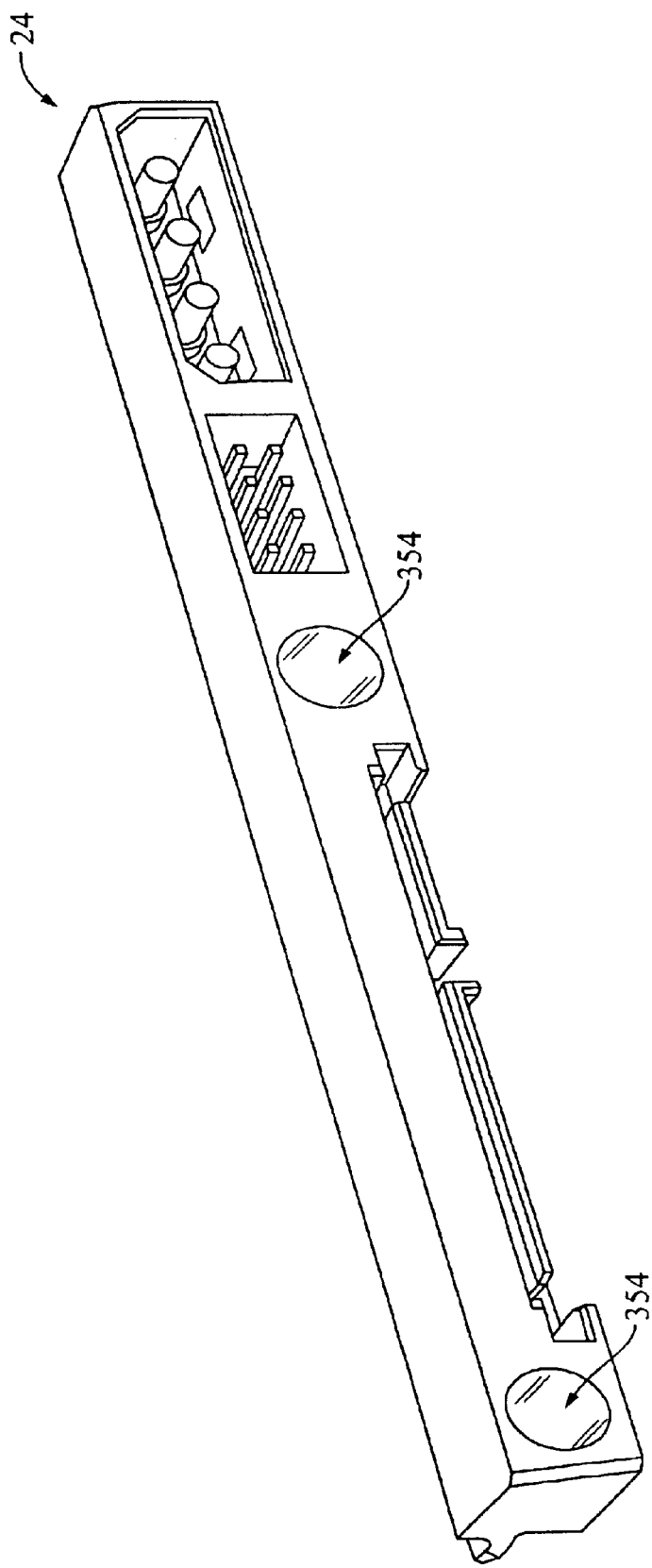
FIG. 5B shows a perspective view of a PCB connector having guide arm receiving cavities that are approximately oval shaped, according to one embodiment of the invention.
Figure 5C:
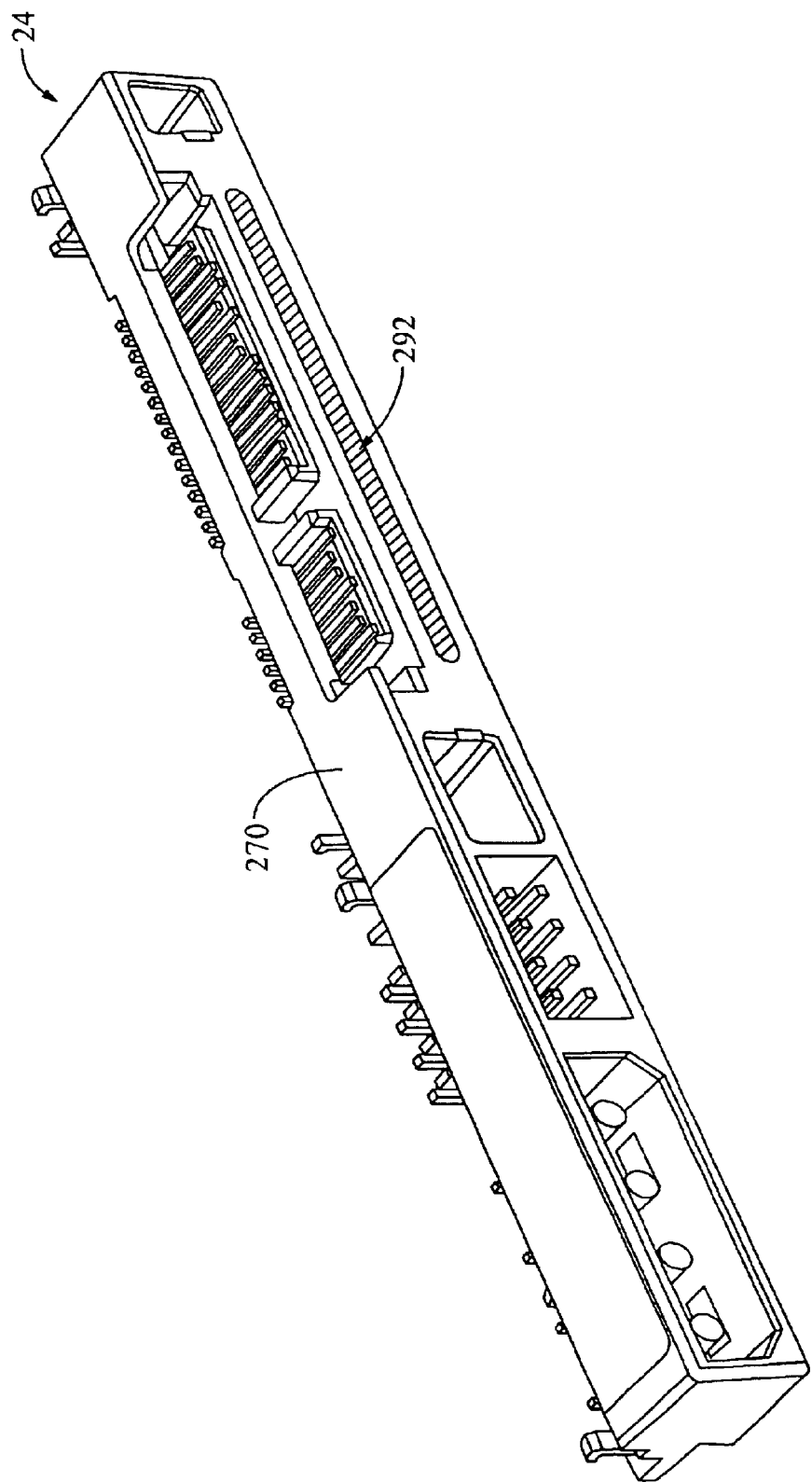
FIG. 5C shows a perspective view of another embodiment of the PCB connector, according to one embodiment of the invention.

In one embodiment, the guide arm receiving cavities 254 are approximately rectangularly shaped and may be differently sized, as particularly shown in FIG. 5A. With brief reference to FIG. 5B, in another embodiment, the guide arm receiving cavities 354 may be approximately oval shaped and may also be differently sized. Further with brief reference to FIG. 5C, the housing 270 of the PCB connector 24 may further have an elongated slot 292 for the receipt of the second guide arms 458, 468, and 488 of the data signal only cable connector 448, the power signal only cable connector 460, and the combined data and power signal cable connector 480, respectively, all of which are shaped as elongated tongues, as previously discussed.

Returning to FIGS. 2 and 5A, the housing 270 further includes substantially thickened strengthening walls 260 disposed between the cable connector receiving area 252 and the guide arm receiving cavities 254 making the PCB connector 24 very robust.

Accordingly, above and beyond presently manufactured cable connectors that mate to the SATA standards defined cable connector receiving area of presently manufactured PCB connectors, embodiments of the present invention relate to a more robust SATA compliant cable connector 22 and SATA compliant PCB connector 24 that avoid many of the breakage problems associated with these present devices. This further applies to the other disclosed alternative embodiments of cable connector 22 such as power signal only cable connector 422, data signal only cable connector 448, power signal only cable connector 460, and combined data and power signal cable connector 480. With the embodiments of present invention, one or both of the data blade-receiving portion 212 and/or the power blade-receiving portion 225 mate with their respective data blade connector 206 and/or power blade connector 228 of the SATA defined cable connector receiving area 252, in which one or both of guide rails 227,234 of the data blade-receiving portion 212 and/or the power blade-receiving portion 225 mate with one or both of the guide slots 271 of the cable connector receiving area, respectively.

More particularly, according to embodiments of the invention, the housing 210 of the cable connector 22 rigidly contains one or both of the data blade-receiving portion 212 and/or the power blade-receiving portion 225, and when the cable connector 22 is mated to the PCB connector 24, the pair of laterally-opposed guide arms 220 of the cable connector 22 mate with the pair of laterally-opposed guide arm cavities 254 of the PCB connector 24 such that the blade-receiving portions 212,225 of the cable connector mate with the blade connectors 206,228 of the PCB connector in an aligned and firm manner such that the common problems associated with the breakage of the blade connectors is avoided. This is further applicable to the other disclosed alternative embodiments of cable connector 22 such as power signal only cable connector 422, data signal only cable connector 448, power signal only cable connector 460, and combined data and power signal cable connector 480. However, in the case of data signal only cable connector 448 and power signal only cable connector 460 only one guide arm mates with a respective guide arm receiving cavity.

Thus, the guide arms 220 mating with the guide arm receiving cavities 254 align the blade-receiving portions 212,225 of the various embodiments of the disclosed cable connectors with the blade connectors 206,228 of the PCB connector 24. Moreover, much of the forces associated with the blade-receiving portions mating to the blade connectors are transferred to the guide arms 220, the guide arm receiving cavities 254, and the substantially thickened strengthening walls 260 of the strengthened housing 270 of the PCB connector 24. This further reduces the forces applied to the blade connectors to further avoid breakage.

Also, the housing 270 of the PCB connector 24 may further include a legacy Integrated Drive Electronics (IDE) power section receptacle 266, and a user section receptacle 268. The legacy IDE power section receptacle 266 includes various legacy pins 267, such as 12 V and 5 V power pins and associated ground pins that are connected to the PCB 13, and that can be used for powering a storage peripheral, such as a disk drive, instead of utilizing the SATA power blade connector.

Further, the housing 270 of the PCB connector 24 may further include a user section receptacle 268 that includes a plurality of square pins 269 that are utilized to command a storage peripheral, such as a disk drive, to operate in a plurality of different modes. In the disk drive embodiment, the user section receptacle 268 is often used in disk drive testing. The square pins 269 of the user section receptacle 228 are connected to the PCB 13.

Embodiments of the present invention for the various cable connectors and the PCB connector 24 also provide for pre-grounding (i.e. the dissipation of electro-static discharge (ESD)). As previously discussed, one or both of the guide arms 220 of the various disclosed cable connectors may include a conductive contact 237 such as a grounding clip.

As will be described in more detail later, the grounding contacts 237 of the guide arms may be coupled to ground conductors of the data and power shielded cables 272,275 connected inside of the data and power blade-receiving portions 212,225, respectively, in order to effectuate various grounding configurations for pre-grounding. Further, one or both of guide arm receiving cavities 254 may include a conductive surface such as a grounding tab 264 (e.g. a metal grounding tab). Each grounding tab 264 is coupled to ground on the PCB 13 by a ground post 263, respectively. Also, it should be appreciated that either the rectangular or oval shaped guide arm receiving cavities may include conductive surfaces for mating with a corresponding grounding contact of a corresponding rectangular or oval shaped guide arm.

Accordingly, as an example, when the cable connector 22 is mated to the PCB connector 24, the conductive contacts 237 of the guide arms 220 will engage the grounding tabs 264 of the guide arm receiving cavities 254 providing pre-grounding to either one or both of the data and/or power blade-receiving portions 212,225 before they engage with the corresponding data and/or power blade connectors 206, 228. This of course applies to the other disclosed alternative embodiments of cable connector 22 such as power signal only cable connector 422, data signal only cable connector 448, power signal only cable connector 460, and combined data and power signal cable connector 480. Specific examples of this, related to the cable connector 22 as an example, will now be described.

However, in an alternative embodiment, the housing 210 and the guide arms 220 may be made from a conductive plastic material such that the cable connector 22 is conductive. Further, in one embodiment, the housing 270 of the PCB connector 24 may also be made from a conductive plastic material such that the PCB connector 24 is also conductive and can be grounded. In this way, when the conductive cable connector 22 is mated to the conductive PCB connector 24, the guide arms 220 will first engage the guide arm receiving cavities 254 providing pre-grounding to either one or both of the data and/or power blade-receiving portions 212,225 before they engage with the corresponding data and/or power blade connectors 206,228. This also applies to the other disclosed alternative embodiments of cable connector 22 such as power signal only cable connector 422, data signal only cable connector 448, power signal only cable connector 460, and combined data and power signal cable connector 480.

Figure 6A:
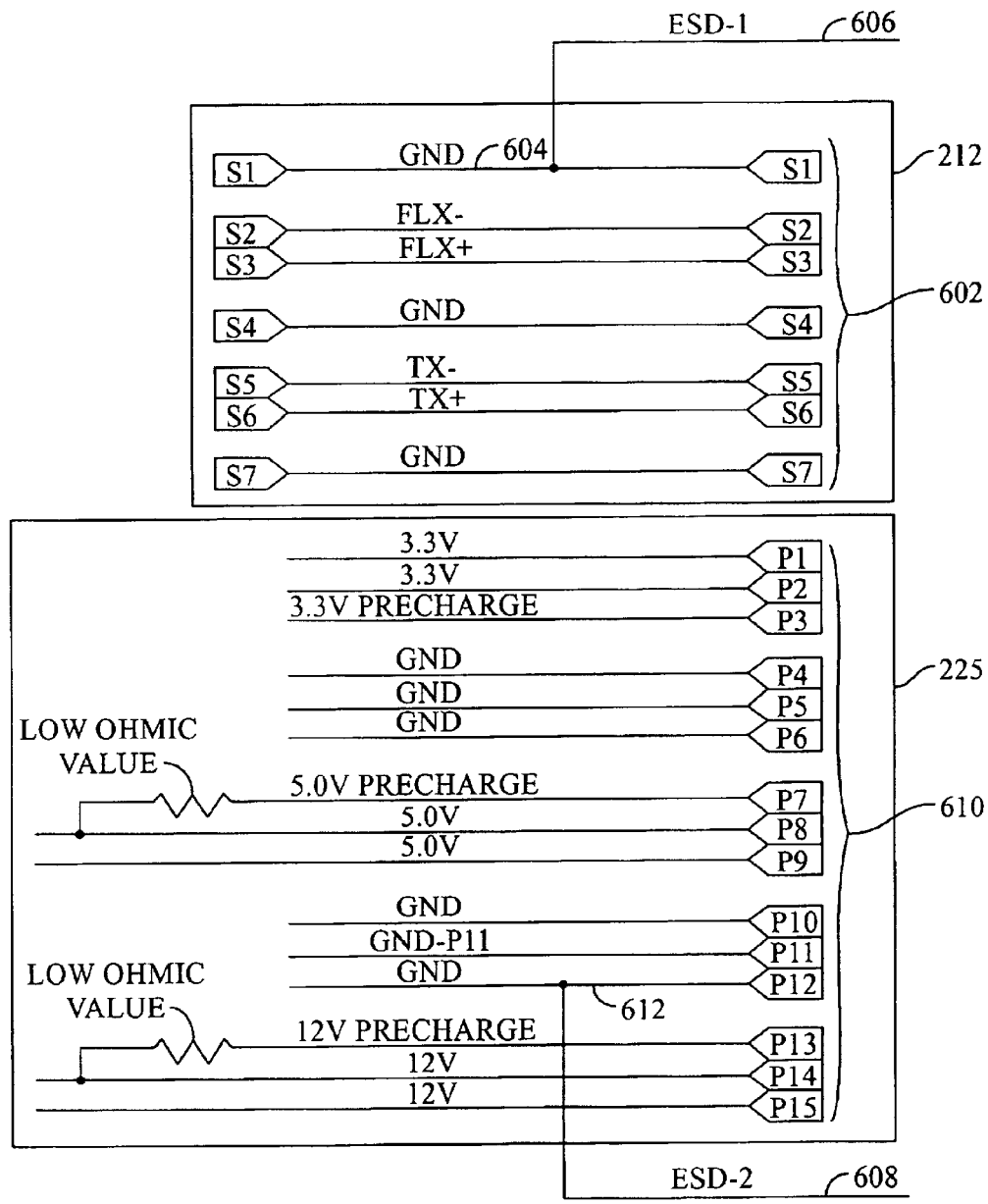
FIG. 6A is a schematic diagram showing a pre-grounding configuration wherein both the data blade-receiving portion and the power blade-receiving portion of the cable connector are configured for pre-grounding to the PCB connector, according to one embodiment of the invention.

Various types of grounding configurations for pre-grounding will now be discussed. With reference now to FIG. 6A, FIG. 6A is a schematic diagram showing a pre-grounding configuration wherein both the data blade-receiving portion 212 and the power blade-receiving portion 225 of the cable connector 22 are configured for pre-grounding to the PCB connector 24. A plurality of data SATA signal conductors 602 of the data SATA shielded cable 272 are shown, which are located in the data blade-receiving portion 212 and are connected to the data electrical contact arrangement 213. Particularly, a ground conductor 604 is directly coupled to a grounding contact 237 (e.g. a ground clip) of one of the guide arms 220 for pre-grounding (i.e. electro-static discharge (ESD)). This is shown as line 606 (ESD-1). Further, a plurality of power SATA signal conductors 610 of the power SATA shielded cable 274 are shown, which are located in the power blade-receiving portion 225 and are connected to the power electrical contact arrangement 232. Particularly, a ground conductor 612 is directly coupled to a grounding contact 237 (e.g. a ground clip) of one of the guide arms 220 for pre-grounding (i.e. electro-static discharge (ESD)). This is shown as line 608 (ESD-1).

Accordingly, when the cable connector 22 is mated to the PCB connector 24, the grounding contacts 237 of the guide arms 220 will engage the grounding tabs 264 of the guide arm receiving cavities 254 providing pre-grounding to the data and power blade-receiving portions 212,225 before they engage with the corresponding data and power blade connectors 206,228. Alternatively, in the conductive cable connector and PCB connector embodiment, the ground conductors may just be coupled to the guide arms to provide pre-grounding. Further, it should be appreciated that this grounding configuration for pre-grounding is also applicable to other disclosed alternative embodiments of cable connectors such as the combined data and power signal cable connector 480.

Figure 6B:
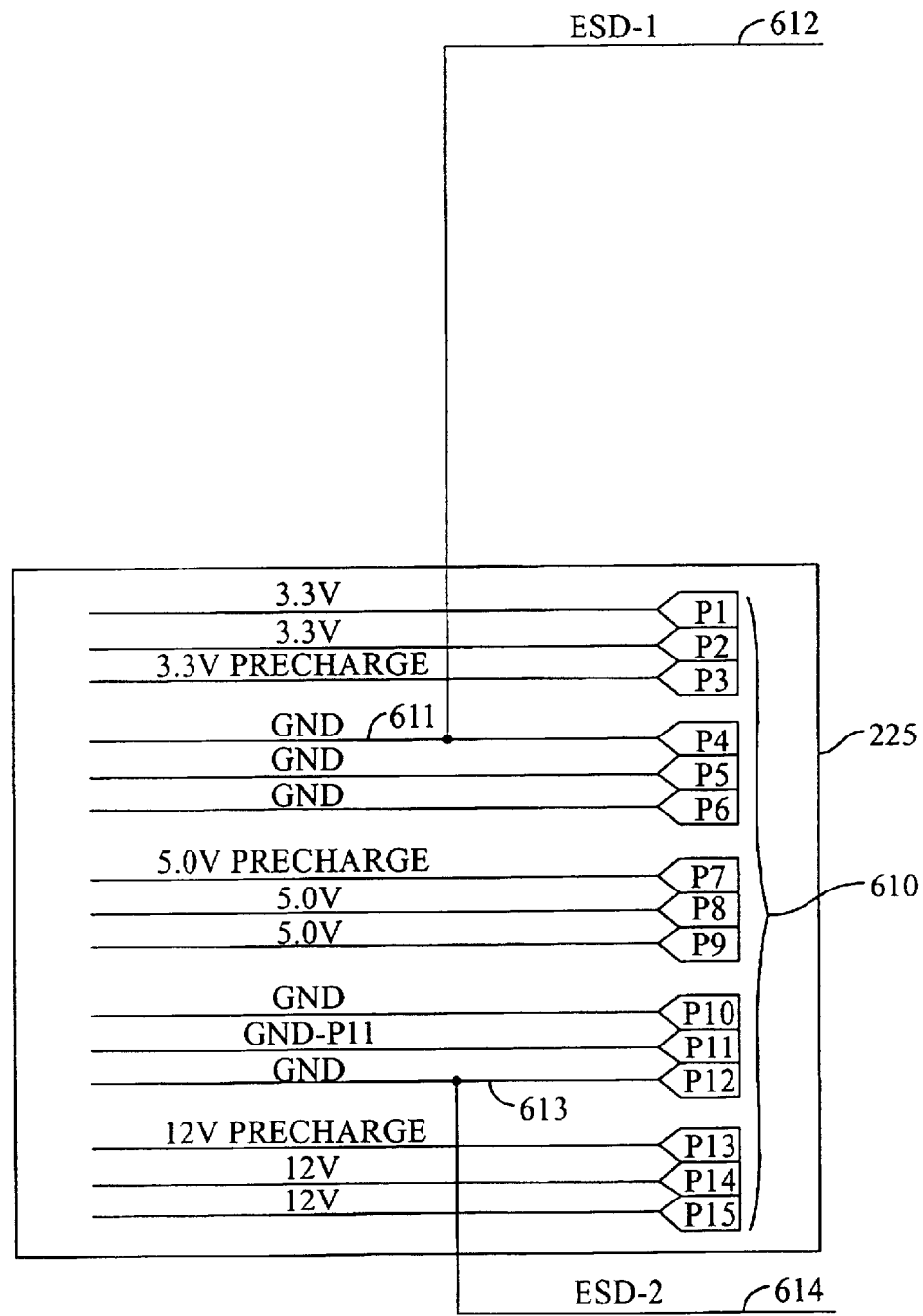
FIG. 6B is a schematic diagram showing a pre-grounding configuration wherein the data blade-receiving portion is not present and the power blade-receiving portion of the cable connector is configured for pre-grounding to the PCB connector, according to one embodiment of the invention.

With reference now to FIG. 6B, FIG. 6B is a schematic diagram showing a pre-grounding configuration wherein the data blade-receiving portion is not present and the power blade-receiving portion 225 of the cable connector 22 is configured for pre-grounding to the PCB connector 24. A plurality of power SATA signal conductors 610 of the power SATA shielded cable 274 are shown, which are located in the power blade-receiving portion 225 and are connected to the power electrical contact arrangement 232. Particularly, a first ground conductor 611 is directly coupled to a grounding contact 237 (e.g. a ground clip) of one of the guide arms 220 for pre-grounding (i.e. electro-static discharge (ESD)), which is shown as line 612 (ESD-1). Further, a second ground conductor 613 is directly coupled to a grounding contact 237 (e.g. a ground clip) of one of the guide arms 220 for pre-grounding (i.e. electro-static discharge (ESD)), which is shown as line 614 (ESD-2). Accordingly, when the cable connector 22 is mated to the PCB connector 24, the grounding contacts 237 of the guide arms 220 will engage the grounding tabs 264 of the guide arm receiving cavities 254 providing pre-grounding for the power blade-receiving portion 225 before it engages with the corresponding power blade connector 228. Alternatively, in the conductive cable connector and PCB connector embodiment, the ground conductors may just be coupled to the guide arms to provide pre-grounding. Further, it should be appreciated that this grounding configuration for pre-grounding is also applicable to other disclosed alternative embodiments of cable connectors such as the power signal only cable connector 422 and the power signal only cable connector 460.

Figure 6C:
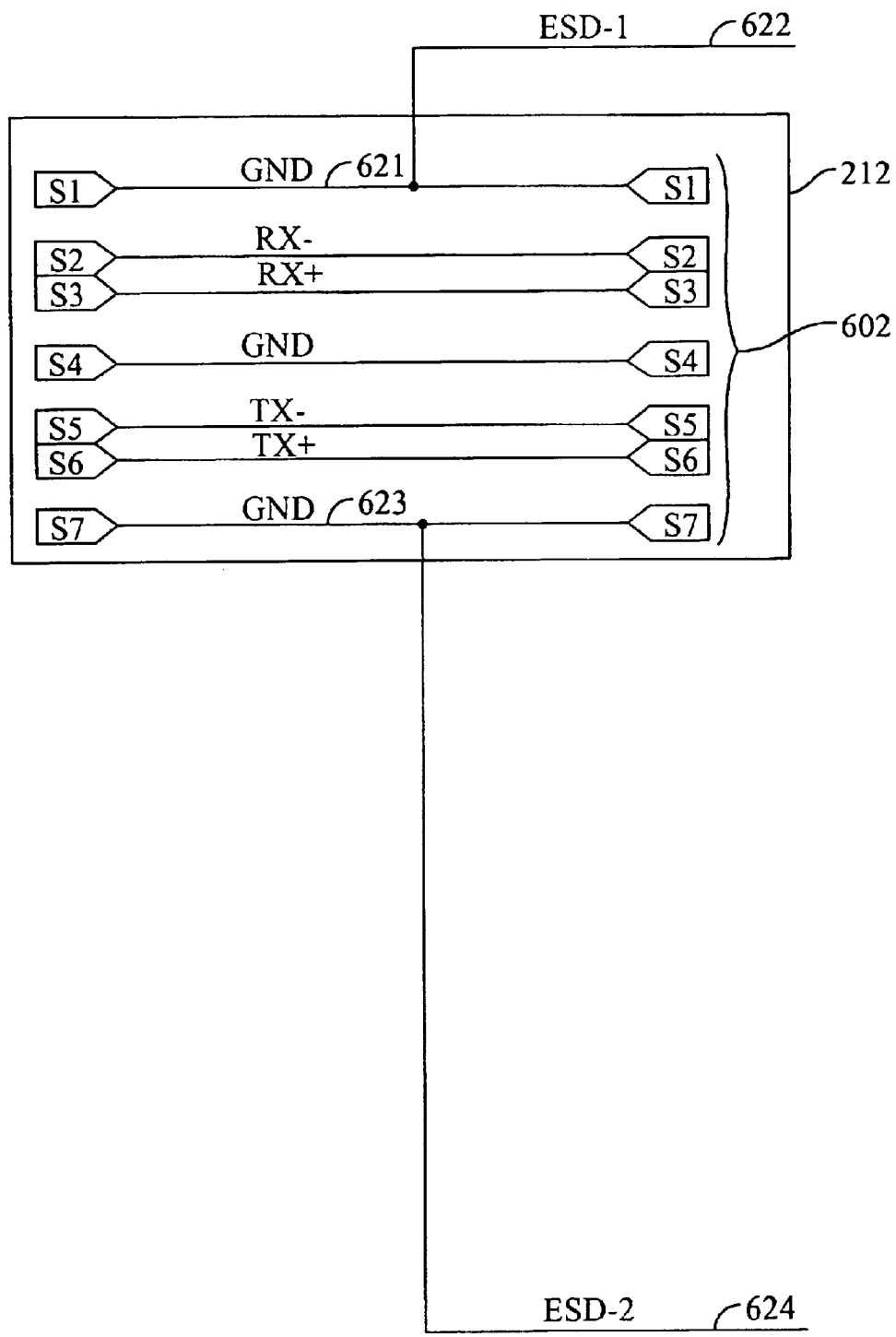
FIG. 6C is a schematic diagram showing a pre-grounding configuration wherein the power blade-receiving portion is not present and the data blade-receiving portion of the cable connector is configured for pre-grounding to the PCB connector, according to one embodiment of the invention.

Looking now at FIG. 6C, FIG. 6C is a schematic diagram showing a pre-grounding configuration wherein the power blade-receiving portion is not present and the data blade-receiving portion 212 of the cable connector 22 is configured for pre-grounding to the PCB connector 24. A plurality of data SATA signal conductors 602 of the data SATA shielded cable 272 are shown, which are located in the data blade-receiving portion 212 and are connected to the data electrical contact arrangement 213. Particularly, a first ground conductor 621 is directly coupled to a grounding contact 237 (e.g. a ground clip) of one of the guide arms 220 for pre-grounding (i.e. electro-static discharge (ESD)), which is shown as line 622 (ESD-1). Further, a second ground conductor 623 is directly coupled to a grounding contact 237 (e.g. a ground clip) of one of the guide arms 220 for pre-grounding (i.e. electrostatic discharge (ESD)), which is shown as line 624 (ESD-2). Accordingly, when the cable connector 22 is mated to the PCB connector 24, the grounding contacts 237 of the guide arms 220 will engage the grounding tabs 264 of the guide arm receiving cavities 254 providing pre-grounding for the data blade-receiving portion 225 before it engages with the corresponding data blade connector 206. Alternatively, in the conductive cable connector and PCB connector embodiment, the ground conductors may just be coupled to the guide arms to provide pre-grounding. Further, it should be appreciated that this grounding configuration for pre-grounding is also applicable to other disclosed alternative embodiments of cable connectors such as the data signal only cable connector 448.

Figure 6D:
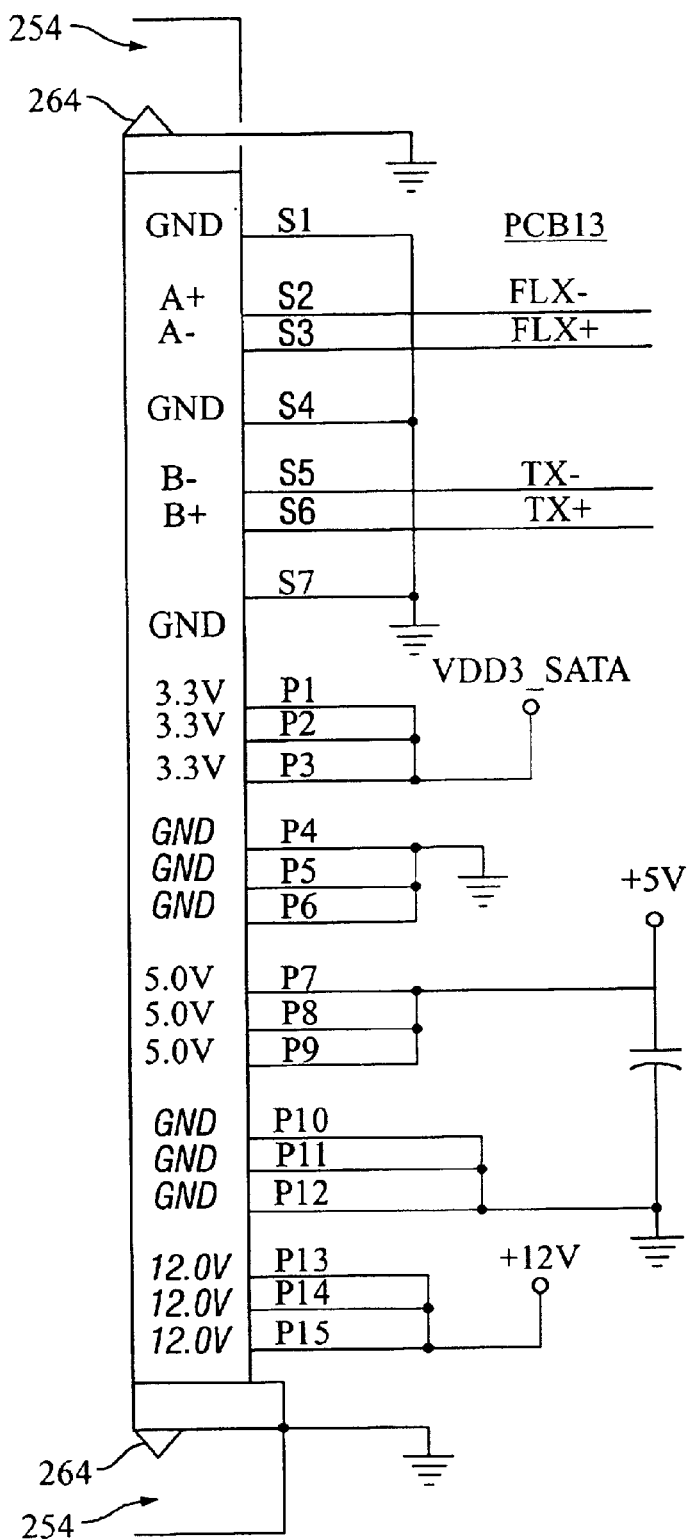
FIG. 6D shows a layout of the data and power signal contacts of the data and power blade connectors of the PCB connector onto the PCB and further shows grounding tabs of the guide arm receiving cavities coupled to ground on the PCB, according to one embodiment of the invention.

Turning now to FIG. 6D, FIG. 6D shows the layout of the data and power signal contacts of the data and power blade connectors 206,228 of the PCB connector 24 onto the PCB 13 and further shows grounding tabs 264 of the guide arm receiving cavities 254 coupled to ground on PCB 13. It should be appreciated that the grounding tabs 264 could also be coupled to a ground at another location. For example, in the disk drive embodiment, the grounding tabs could be coupled to the grounded chassis of the disk drive.

It should be appreciated by those skilled in the art that although embodiments of the invention for cable connectors have been presented having only one data blade-receiving portion, only one power blade-receiving portion, and only one data and one power blade-receiving portion that a wide variety of cable connectors having multiple types of blade-receiving portions such as: multiple data blade-receiving portions, multiple power blade-receiving portions, and multiple data and power blade-receiving portions, as well as other types of blade-receiving portions are deemed to lie within the spirit and scope of the invention.

It should further be appreciated by those skilled in the art that although embodiments of the invention for cable connectors and PCB connectors have been illustrated for use with storage peripherals, such as disk drives, utilizing a SATA standard, such as the Serial ATA: High Speed Serialized AT Attachment standard or the Serial Attached Small Computer System Interface (SAS) standard, that numerous alternative types of cable connectors and PCB connectors for various types of electronic devices utilizing differing types standards are deemed to lie within the spirit and scope of the invention.

We claim:

1. A PCB connector for connection to a Printed Circuit Board (PCB), the PCB connector comprising:
    a first blade connector for supporting a first electrical contact arrangement in accordance with a Serial Advanced Technology Attachment (SATA) standard;
    a housing for supporting the blade connector and the first electrical contact arrangement, the housing defining a cable connector receiving area around the first blade connector for receipt of a cable connector; and
    a pair of laterally-opposed differently-sized polygonally-shaped guide arm receiving cavities being integrally formed with the housing and being disposed outside the cable connector receiving area, the guide arm receiving cavities adapted for the receipt of laterally-opposed differently-sized polygonally-shaped guide arms from a mating cable connector.

2. The PCB connector of claim 1, wherein the first electrical contact arrangement is configured for data signals in accordance with the SATA standard.

3. The PCB connector of claim 1, wherein the first electrical contact arrangement is configured for power signals in accordance with the SATA standard.

4. The PCB connector of claim 1, further comprising a second blade connector having a second electrical contact arrangement in accordance with the SATA standard, the second blade connector being located inside the cable connector receiving area of the housing.

5. The PCB connector of claim 4, wherein the first electrical contact arrangement is configured for data signals in accordance with the SATA standard and the second electrical contact arrangement is configured for power signals in accordance with the SATA standard.

6. The PCB connector of claim 1, further comprising substantially thickened strengthening walls disposed between the cable connector receiving area and the guide arm receiving cavities, respectively.

7. The PCB connector of claim 1, wherein at least one of the guide arm receiving cavities includes a conductive surface.

8. The PCB connector of claim 7, wherein the conductive surface comprises a grounding tab.

9. PCB connector of claim 1, wherein the housing and the guide arm receiving cavities are made from a conductive plastic material.

10. The PCB connector of claim 1, wherein the guide arm receiving cavities are approximately rectangularly shaped.

11. The PCB connector of claim 1, wherein the SATA standard is a Serial Attached Small Computer System Interface (SCSI) standard.

12. The PCB connector of claim 1, wherein the housing further includes a legacy Integrated Drive Electronics (IDE) power receptacle.

13. The PCB connector of claim 1, wherein the housing further includes a user section receptacle.

14. A PCB connector for connection to a Printed Circuit Board (PCB), the PCB connector comprising:

a first blade connector for supporting a first electrical contact arrangement in accordance with a Serial Advanced Technology Attachment (SATA) standard;

a second blade connector for supporting a second electrical contact arrangement in accordance with the Serial Advanced Technology Attachment (SATA) standard;

a housing for enclosing the first and second blade connectors and the supported electrical contact arrangements, the housing defining a cable connector receiving area around the first and second blade connectors for the receipt of at least one cable connector; and a pair of laterally-opposed differently-sized polygonally-shaped guide arm receiving cavities being integrally formed with the housing and being disposed outside the cable connector receiving area, the guide arm receiving cavities adapted for the receipt of laterally-opposed differently-sized polygonally-shaped guide arms from a mating cable connector.

15. The PCB connector of claim 14, wherein the first electrical contact arrangement is configured for data signals in accordance with the SATA standard and the second electrical contact arrangement is configured for power signals in accordance with the SATA standard.

16. The PCB connector of claim 14, further comprising substantially thickened strengthening walls disposed between the cable connector receiving area and the guide arm receiving cavities, respectively.

17. The PCB connector of claim 14, wherein at least one of the guide arm receiving cavities includes a conductive surface.

18. The PCB connector of claim 17, wherein the conductive surface comprises a grounding tab.

19. The PCB connector of claim 14, wherein the housing and the guide arm receiving cavities are made from a conductive plastic material.

20. PCB connector of claim 14, wherein the guide arm receiving cavities are approximately rectangularly shaped.

21. The PCB connector of claim 14, wherein the SATA standard is a Serial Attached Small Computer System Interface (SCSI) standard.

22. The PCB connector of claim 14, wherein the housing further includes a legacy Integrated Drive Electronics (IDE) power receptacle.

23. The PCB connector of claim 14, wherein the housing further includes a user section receptacle.

* * * * *